US010338282B2

(12) United States Patent
Powell et al.

(10) Patent No.: US 10,338,282 B2
(45) Date of Patent: Jul. 2, 2019

(54) INCREASED ACCURACY CORNER CUBE ARRAYS FOR HIGH RESOLUTION RETRO-REFLECTIVE IMAGING APPLICATIONS

(71) Applicant: MICROSOFT TECHNOLOGY LICENSING, LLC, Redmond, WA (US)

(72) Inventors: Karlton Powell, Lake Stevens, WA (US); John Lutian, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 159 days.

(21) Appl. No.: 15/422,441

(22) Filed: Feb. 1, 2017

(65) Prior Publication Data

US 2017/0146703 A1 May 25, 2017

Related U.S. Application Data

(62) Division of application No. 14/538,783, filed on Nov. 11, 2014, now Pat. No. 9,599,757.

(Continued)

(51) Int. Cl.
*G02B 5/124* (2006.01)
*G03B 21/60* (2014.01)

(Continued)

(52) U.S. Cl.
CPC .............. *G02B 5/124* (2013.01); *G02B 1/113* (2013.01); *G02B 27/2292* (2013.01); *G03B 21/60* (2013.01)

(58) Field of Classification Search
CPC .......... G02B 5/124; G02B 5/32; G02B 1/113; G02B 27/2292; G03B 21/60

(Continued)

(56) References Cited

U.S. PATENT DOCUMENTS 5,418,584 A 5/1995 Larson
5,764,411 A 6/1998 Shanks (Continued)

FOREIGN PATENT DOCUMENTS

DE 102009007124 A1 8/2010
EP 1785752 A1 5/2007

(Continued)

OTHER PUBLICATIONS

"Office Action Issued in European Patent Application No. 15788245.7", dated Jul. 25, 2018, 6 Pages.

(Continued)

*Primary Examiner* — Frank G Font
(74) *Attorney, Agent, or Firm* — Ray Quinney & Nebeker P.C.; John O. Carpenter

(57) ABSTRACT

Tooling and optic elements for a retro-imaging system may be formed on order near atomic level of accuracy by making use of either etching or growth techniques of a cubic crystal lattice, such as silicon. The elements may be formed directly using selective etching or epitaxial growth by coating and clear resin lamination, or replicated to avoid shrinkage and curvature by use of low shrinkage resins or double-fill molding techniques. Through the use of these highly accurate reflection/diffraction elements, floating images may be formed with relatively high resolution in retro-reflective imaging systems, for example.

20 Claims, 29 Drawing Sheets

102 110 116 100 118 114 112 106 104 120 108 124 122

Related U.S. Application Data

(60) Provisional application No. 62/062,732, filed on Oct. 10, 2014.

(51) Int. Cl.
*G02B 27/22* (2018.01)
*G02B 1/113* (2015.01)

(58) Field of Classification Search
USPC .......................................... 359/529, 530, 546
See application file for complete search history.

(56) References Cited

U.S. PATENT DOCUMENTS

| | | | | |
|---|---|---|---|---|
| 5,973,845 | A | 10/1999 | Hildebrand et al. | |
| 7,450,799 | B2 | 11/2008 | Selbrede et al. | |
| 7,561,330 | B2 | 7/2009 | Goto | |
| 7,856,055 | B2 | 12/2010 | Zhou et al. | |
| 2006/0087735 | A1 | 4/2006 | Nilsen et al. | |
| 2008/0198459 | A1* | 8/2008 | Fergason | G02B 5/12 359/529 |
| 2009/0027775 | A1 | 1/2009 | Nilsen et al. | |
| 2009/0273839 | A1 | 11/2009 | Henrichs | |

FOREIGN PATENT DOCUMENTS

| | | | |
|---|---|---|---|
| EP | 2360499 | A1 | 8/2011 |
| EP | 2527883 | A1 | 11/2012 |
| WO | 2005114268 | A2 | 12/2005 |

OTHER PUBLICATIONS

"Office Action Issued in Chinese Patent Application No. 201580055051.7", dated Jun. 14, 2018, 12 Pages.
"Non Final Office Action Issued in U.S. Appl. No. 14/538,783", dated Jul. 29, 2016, 8 Pages.
"Notice of Allowance Issued in U.S. Appl. No. 14/538,783", dated Nov. 10, 2016, 5 Pages.
Martins, Ricardo F., "A Wearable Head-Mounted Projection Display", A Dissertation Submitted in Partial Fulfillment of the Requirements for the degree of Doctor of Philosophy in the Department of Modeling and Simulation in the College of Sciences at the University of Central Florida, Dec. 2010, 135 Pages.
"International Preliminary Report on Patentability Issued in PCT Application No. PCT/US2015/054353", dated Jan. 4, 2017, 6 Pages.
"International Search Report and Written Opinion Issued in PCT Application No. PCT/US2015/054353", dated Dec. 16, 2015, 11 Pages.
"Second Written Opinion Issued in PCT Application No. PCT/US2015/054353", dated Sep. 12, 2016, 5 Pages.

* cited by examiner

504

514

INCREASED ACCURACY CORNER CUBE ARRAYS FOR HIGH RESOLUTION RETRO-REFLECTIVE IMAGING APPLICATIONS

CROSS-REFERENCE TO RELATED APPLICATIONS

This Application is a divisional application under 35 U.S.C. § 121 that claims priority under 35 U.S.C. § 120 to a U.S. patent application Ser. No. 14/538,783 filed on Nov. 11, 2014, which claims priority to U.S. Provisional application Ser. No. 62/062,732 filed on Oct. 10, 2014. The Provisional Application is herein incorporated by reference in its entirety.

DETAILED DESCRIPTION

Figure 1:
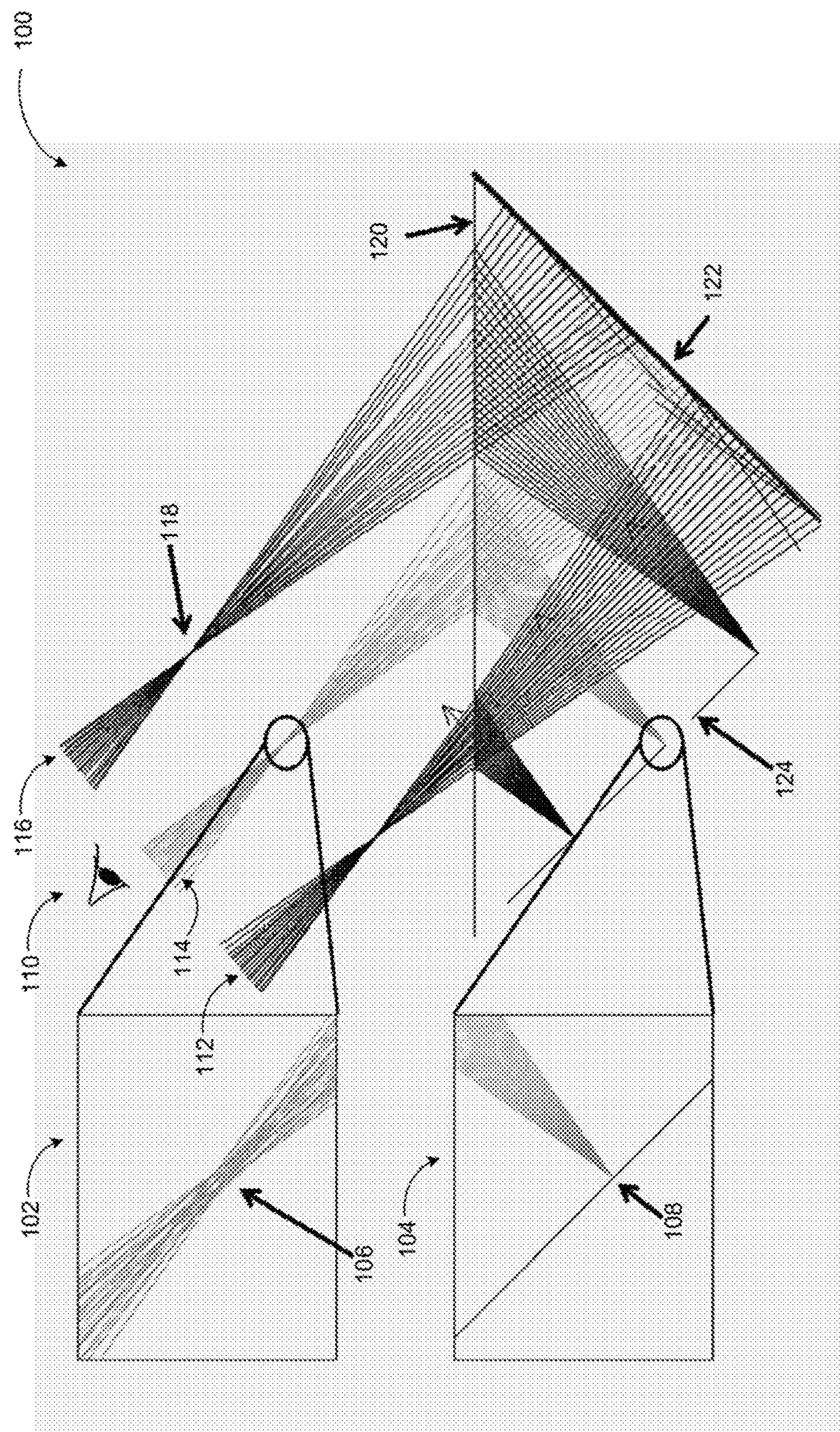
FIG. 1 illustrates a formation of a reconvergent floating image in a retro-reflective display system.

According to some implementations, methods for increased accuracy corner cube arrays for high resolution retro-reflective imaging applications are described. Example methods may include forming corner cube structures on a wafer, reflectively coating facets of the corner cube structures, and forming an increased resolution retro-reflective array from the reflectively coated corner cube structures.

In floating image display systems, a source object light is partially reflected toward a retro-reflective array, which may include reflective facets such as corner cube reflectors. The retro-reflective array may reflect the incoming light in such manner that it is reconvergent, and a portion of that light may be transmitted through a half-mirror upon second pass, forming a reconvergent image or a 'floating' replica of the source light.

Current virtual display systems utilizing corner cube arrays may suffer from low resolution due to a variety of parameters. While diffractive artifacts play a role in degraded experience, an effect of image breakup due to pitch extent may also impact the image quality. Two effects may indeed be competing: diffraction may be reduced by use of larger pitch, but image breakup may be increased in width by using the larger pitch. In addition to the diffraction and pitch tradeoff, the facet angle error may have a substantial contribution to the image resolution in such a system. For example, the impact of facet angle error may increase an angular spread of the reconvergent light on order of approximately 15 times the facet angle error, while an accuracy of less than on order of approximately 0.02° may be needed to approach the diffraction limit alone, in many cases.

While diamond machining or comparable techniques may be utilized to achieve flat facet cuts, such approaches may have limitations, including the fact that the fill factor may be limited to a maximum of near 75% geometric aperturing efficiency for a typical ruled type array, due to 'dead' zones which result from the layout, and the facet flatness being dependent on tool, facet angle error being dependent on tool cutting setup alignment, as well as replication resin shrinkage, for example.

Typically, retro-reflective arrays may be manufacture by diamond cutting, or ruling, one-dimensional arrays of linear cuts in three directions, separated by approximately 60 degrees. However, it may be possible to achieve ruled type layout using crystal lattice methods described herein. An example crystal lattice technique may be selective epitaxial growth to form a full corner cube reflector array, however, to achieve a layout using crystal techniques in order to mimic the layout of ruled approach may be a possible alternative.

Tooling and optic elements for a retro-imaging system may be formed on order of near atomic level of accuracy by making use of either etching or growth techniques of a cubic crystal lattice, such as silicon. The elements may be formed directly using selective etching or epitaxial growth by coating and clear resin lamination, or replicated to avoid shrinkage and curvature by use of low shrinkage resins or double-fill molding techniques. Through the use of these highly accurate reflection/diffraction elements, having greatly reduced facet angle errors and appropriate choice of array pitch based on scale of display and type of array layout, floating images may be formed with relatively high resolution in retro-reflective imaging systems, for example.

These and other features will be apparent from a reading of the following description and a review of the associated drawings. In the following description, references are made to the accompanying drawings that form a part hereof, and in which are shown by way of illustrations, specific implementations, or examples. These aspects may be combined, other aspects may be utilized, and structural changes may be made without departing from the spirit or scope of the present disclosure. The following description is therefore not to be taken in a limiting sense.

FIG. 1 illustrates a formation of a reconvergent floating image in a retro-reflective display system.

Diagram 100 shows one type of imaging system that is capable of forming a real floating image along with large viewing volume or eye box. A retro-imaging system may provide the floating image using a source object light 108 (shown in expanded portion 104, which illustrates an expanded view of source object light 108 on plane 124), a half-mirror (beam splitter 120), and a retro-reflective array 122. In such a system, the source object light 108 may be partially reflected by the beam splitter 120 toward the retro-reflective array 122. The retro-reflective array 122, which may include a plurality of corner cube reflectors (also referred to as corner cube array "CCA"), may reflect that light in such manner that it is reconvergent (118). A portion of that light may transmit through the half-mirror upon second pass, forming the reconvergent image 118, which may be a 'floating' replica of the source light. The floating replica may be formed from 2D or 3D objects.

In the example system of diagram 100, three source lights are used arriving as components 112, 114, and 116 at the viewer's eye 110. These components may be red, green, blue, for example, as basic components of an RGB color system. The source lights may be on a plane 124 that may be described as the source plane, display plane, or object plane depending on the configuration of the system. The accuracy or error in construction of the corner cubes of the CCA forming the retro-reflective array 122 may result in diffraction and/or image breakup 106 as shown in expanded portion 102, which illustrates an expanded view of component 114 at the point of reconvergence.

Conventional floating image display systems utilizing retro-reflective arrays may suffer from low resolution due to fabrication defects in the corner cube elements, limiting their applications as readable text of useful size may not be supported. Enhancement of floating image display system resolution to support readable text may in turn enhance the utility of floating image display systems using corner cube arrays. Such systems supporting display of readable fonts may open new avenues for applications not limited to advertising, human-computer-interfaces, gaming and 3D gesture computer interfaces. Further, use of full CCAs instead of ruled type retro-reflective arrays may improve efficiency, such that the brightness of the floating image display may be increased for a given input light luminance level.

Figure 2:
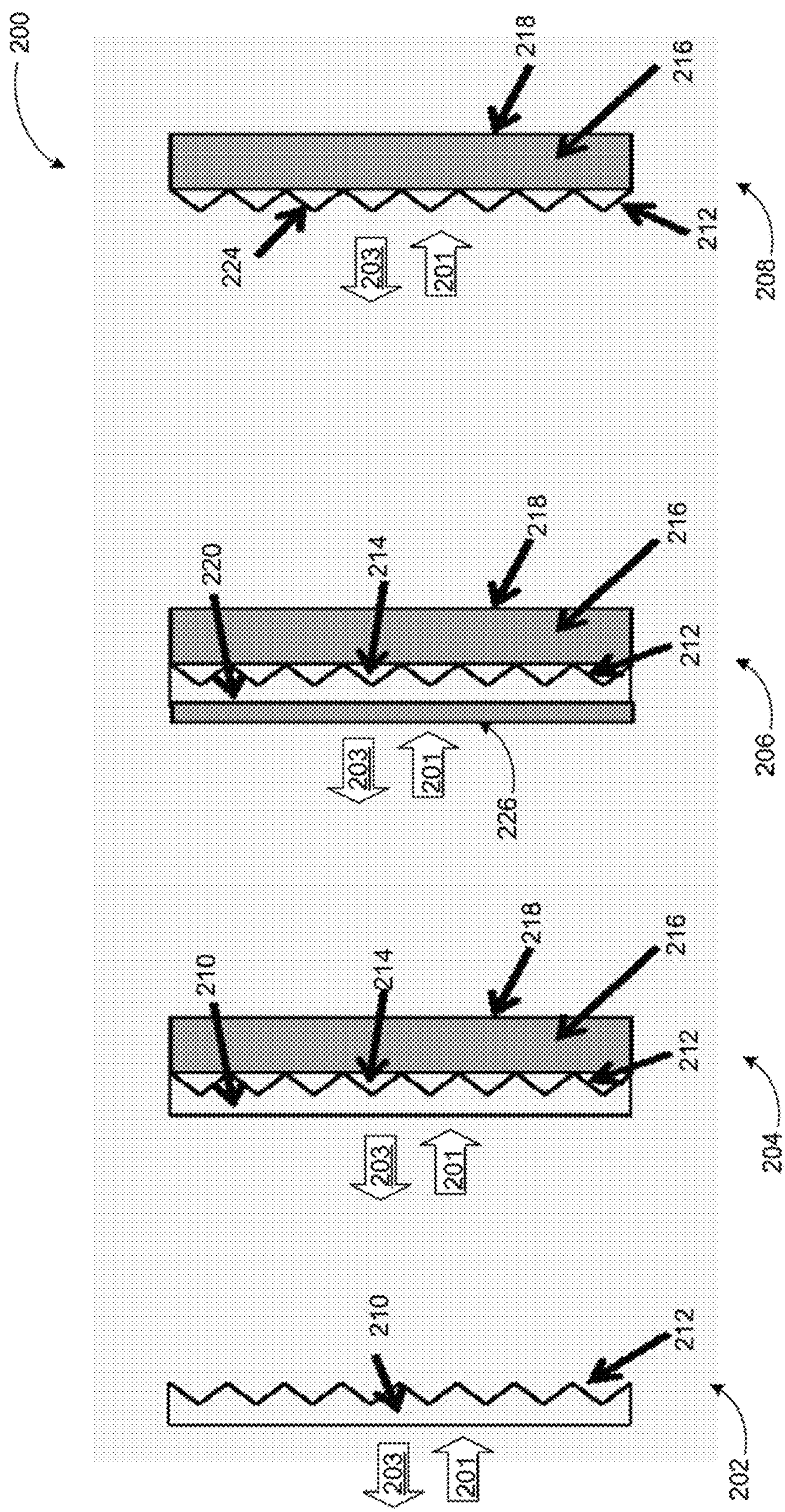
FIG. 2 illustrates example optical stacks for a retro-reflective system using a reflective coated surface.

FIG. 2 illustrates example optical stacks for a retro-reflective system using a reflective coated surface.

The optical designs of corner cube arrays according to various implementations are not limited to surface metallization, internal or external reflection scenarios, sequence of polymer layers, or optical coatings. Diagram 200 shows two examples of direct use and two examples of replica use. In the diagram, input light illuminates (201) the arrays from right to left and reconverges (203) from left to right. In the first example 202, a silicon (or other cubic crystalline material) wafer 210 may be processed to include a reflective coated first surface 212, which may be used as the reflective surface of a retro-reflective array. In the second example 204, a reflective coated second surface 212 may be formed on a processed wafer 210, where the surface may be laminated or filled with an ultra-violet cure clear resin 214, for example. A glass, polymer, hardened glass, hard-coat epoxy, or similar material substrate 216 may be deposited or laminated over the resin. The substrate may be birefringent or not (i.e., coated or laminated with a retarder film), or may include a birefringent layer laminated between the resin fill layer and cover substrate, or a birefringent layer laminated outside the substrate 216. An optional AR coating 218 may be applied to the substrate 216, or in the case of birefringent layer outside substrate 216 may be applied to the outer surface of the birefringent layer.

In the replica use example 206, a low shrinkage replica 220 may be applied on an opposite surface of the wafer 210 with a support substrate 226 for the replica 220. The replica 220 may include, for example, glass microsphere filled adhesive, or be formed through double-fill replication to minimize facet angle error. The reflective coated second surface 212 may be laminated or filled with the clear resin 214 and affixed to the substrate 216 having optional AR coating 218. In the replicated example 208 for usage of second surface, the reflective coated back surface 212 may be on a laminated substrate 216 (optionally with a retarder layer and AR coating 218). Because the retro-reflective surface is the second surface, reflection may be achieved by applying a reflective coating or layer on the second surface or may be optionally uncoated and utilize total internal reflection (TIR) for reflection. The multi-cycle molded surface 224 may be molded through ultra-violet cure resin or compression molding, for example.

Second surface type retro-reflector array may be more beneficial in avoiding high angle ambient light reflections, and, as discussed above, examples of laminated stack may include reflective coated CCA (direct or replicated), clear resin layer, thin clear substrate (glass or polymer film or sheet), and anti-reflective coating.

Figure 3A:
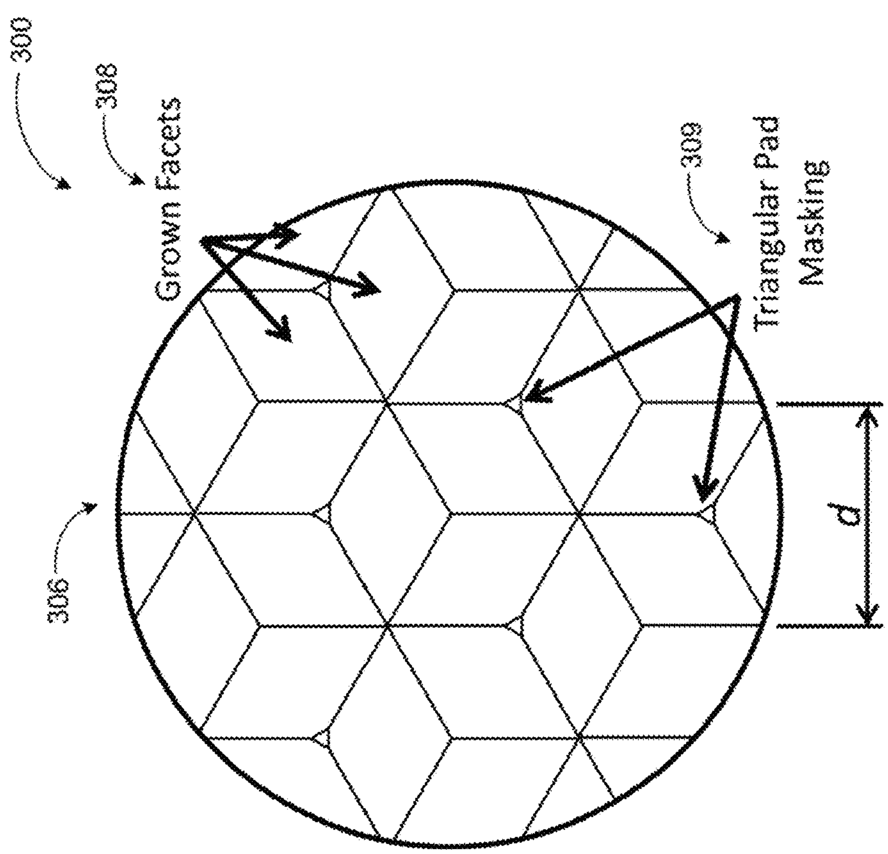
FIG. 3A through 3C illustrate growth of CCA and ruled type reflective elements on a wafer for use in a retro-reflective system.
Figure 3A:
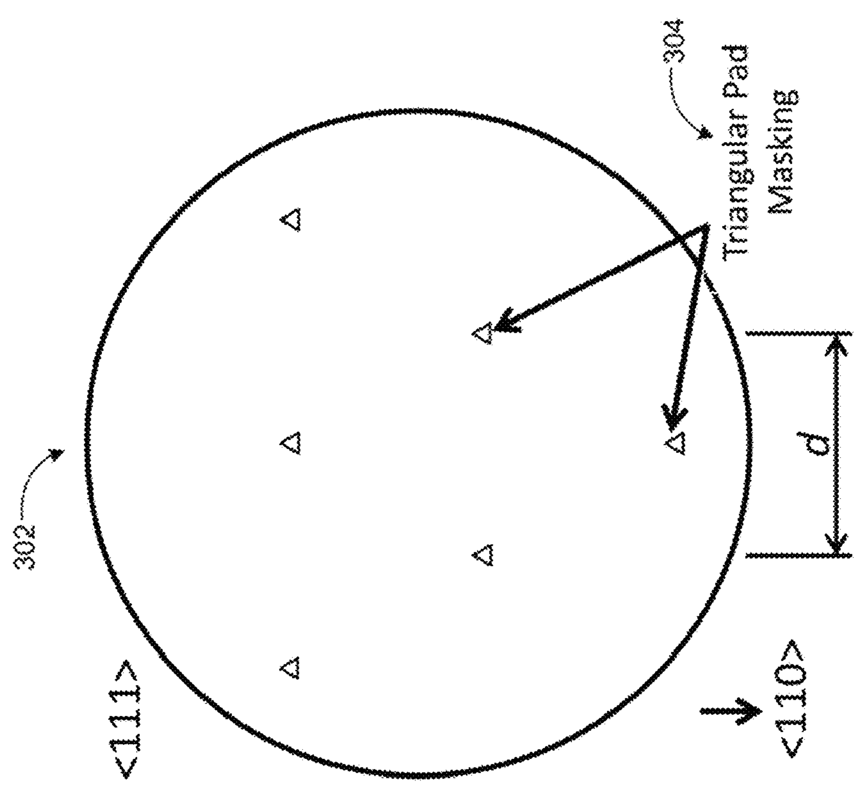
Figure 3B:
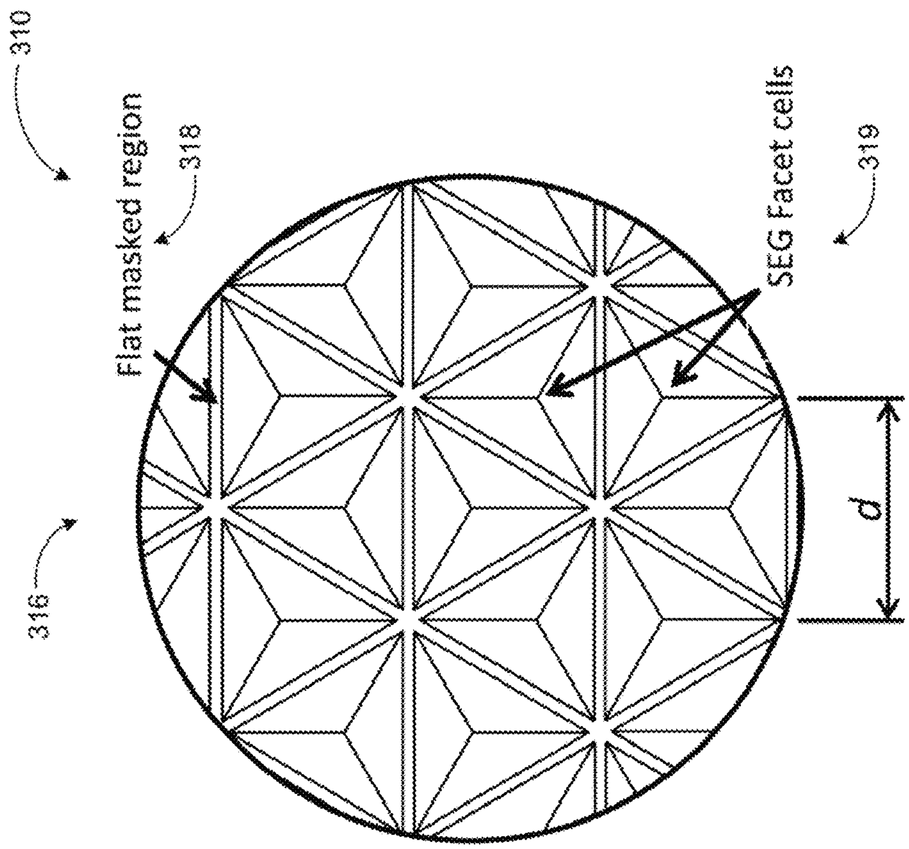
Figure 3B:
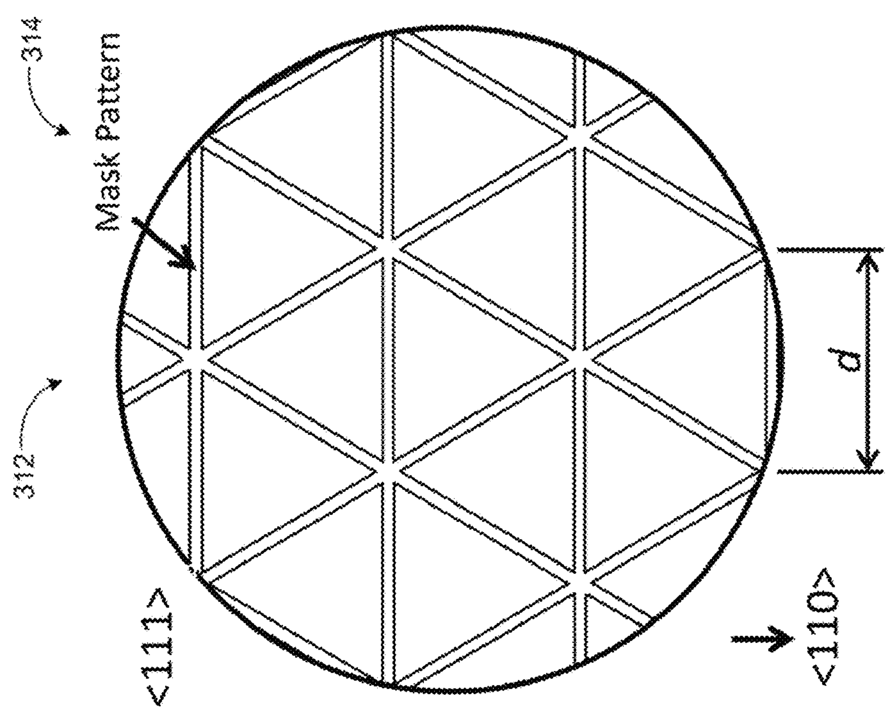
Figure 3C:
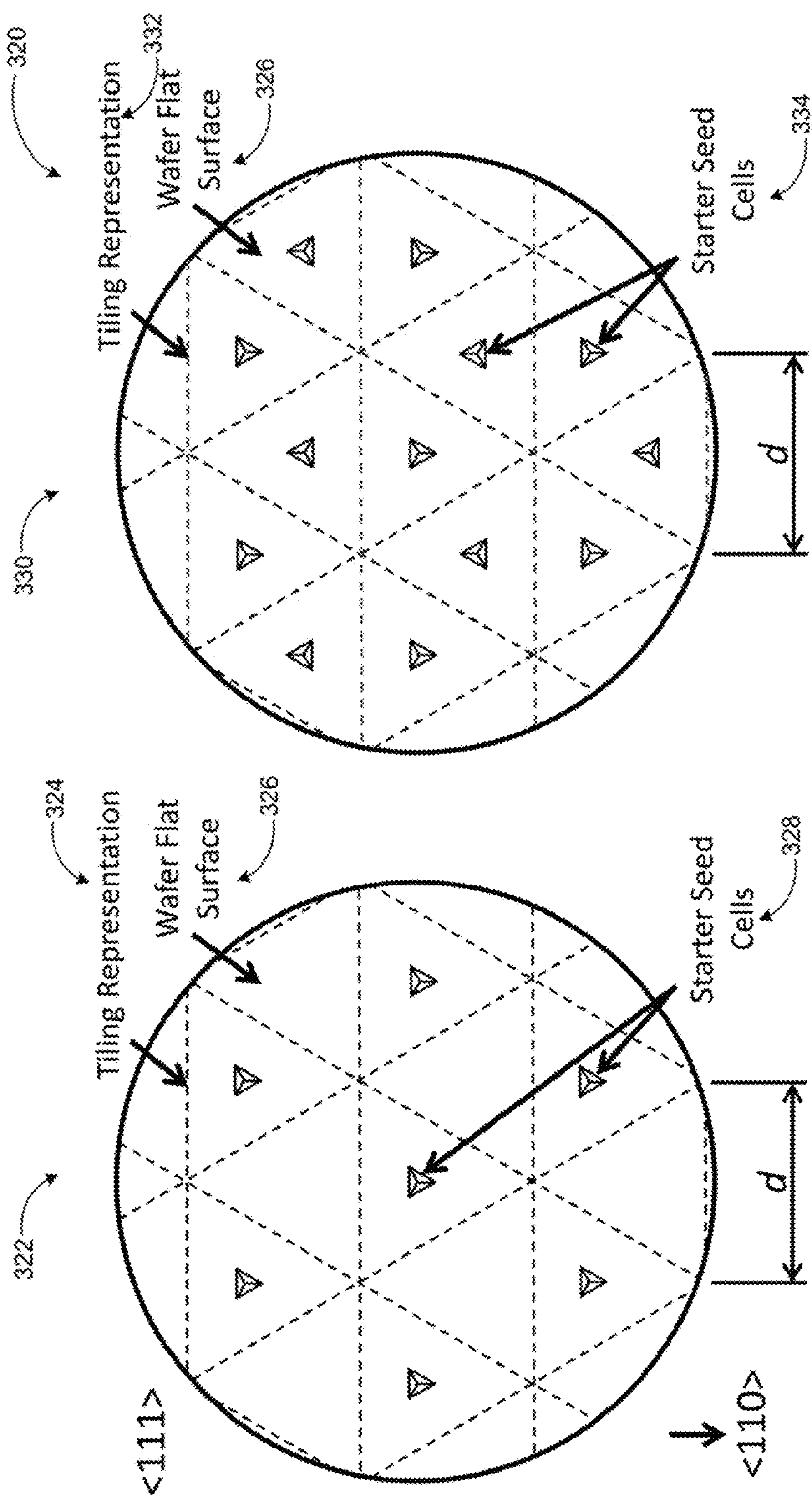

FIG. 3A through 3C illustrate growth of CCA and ruled type reflective elements on a wafer for use in a retro-reflective system.

Diagram 310 in FIG. 3A shows seeding of selective growth using patterned oxide masking for the CCA type elements. Orientation of the wafer is shown as <111> and <110> in the diagram. Patterned masking 302 may be accomplished through triangular pad masks 304 on select locations. Selective epitaxial growth 306 may result in grown facets 308 in between the masked locations 309 through triangular pad masking.

Diagram 320 in FIG. 3B shows seeding of selective growth using patterned oxide masking for the ruled type elements. In contrast with the CCA type, the mask pattern 314 at the masking stage 312 mimics a topography for the ruled type as shown in the diagram. Through selective epitaxial growth (SEG) 316, the SEG facet cells 319 raise above the wafer surface plane, whereas the masked regions 318 remain flat.

Diagram 320 of FIG. 3C shows a comparison of an array of seed cells for full CCA type 322 and an array of seed cells for mimicking the ruled type 330. In the array of seed cells for full CCA type 322, starter seed cells, each comprised of a <111> basal plane and three <100> corner cube faces, 328 may be dispersed through the tiles 324 with empty tiles in between groups of seeded tiles. Wafer flat surface 326 is shown in an empty tile. In the array of seed cells for mimicking the ruled type 330, every tile 332 may be seeded with starter seed cells 334 without empty tiles on the wafer. In one example implementation, the arrays may be formed by grayscale lithography, selective etching through mask array of triangular holes (negative), followed by SEG (positive) or SEG using mask array of triangular holes.

SEG of silicon may generate atomically substantially perfect corner cube arrays. Other precision engineering techniques such as single point diamond turning, computer numerical control machining, laser sintering, and three dimensional printing technologies may suffer from imprecisions that make it difficult to achieve the surface quality and precise surface orientation needed to support high resolution corner cube arrays useful in high resolution virtual displays.

SEG of silicon on <111> silicon planes may be used to produce atomically smooth and precisely oriented <100> surfaces to generate full corner cube array structures approaching up to 100% fill factor. Vapor phase epitaxial growth, for example, using trichlorisilane, HCL and hydrogen gas, may be used to support 200 μm silicon EPI layers. Photolithographic processes may be used to generate a thermal oxide pattern typically 100 nm to 200 nm thick on the <111> surface to initiate selective epitaxial growth. Subsequent silicon SEG processes may result in corner cube arrays defined by thermal oxide patterns prior to EPI deposition. Alternatively, or in addition to using selective epitaxial growth, reactive ion etching and/or chemical etching may also be used to create textured surface. The etched surface may then be cleaned up to flat facets by selective epitaxial growth after the initial surface topography step.

Various replication techniques may be employed to mass produce floating image display systems utilizing corner cube arrays according to some implementations. These may include direct use of the processed silicon wafer by reflective coating as first surface retro-reflective array or direct use by reflective coating and lamination to backside of clear substrate using clear resin fill to form a second surface retro-reflective array. Additional techniques may include high accuracy replication using low shrinkage UV-cure resin with reflective coating, replication using multiple molding cycles on a single molded part to reduce thermal shrinkage or sink impact, high quality compression molding, as well as formation of nickel electroform shims of the master copy with various usage scenarios, direct or replicated.

Furthermore, a master wafer may be tiled by a process of multiple replication of the master tile, and replicas may be tiled to form a larger new master suitable for larger areas, thus larger systems, for a desired corner cube pitch. Tiling techniques may include, but are not limited to, replication in polymer sheet or electroform nickel, and accurate cutting and sizing via milling, grinding, polishing, or electron discharge machining (EDM).

Precision fabrication using selective epitaxial growth of corner cube arrays may enable precise replication of corner cube geometry with angular errors approximately less than 0.03° of crystallographic orientation allowing use of such CCAs in retro-reflective imaging applications.

Figure 4:
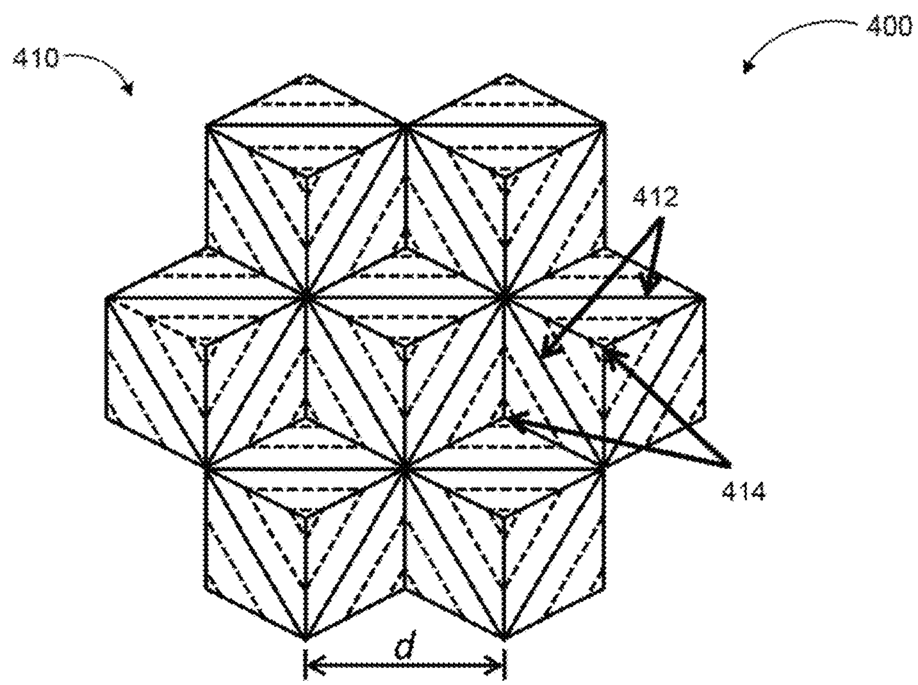
FIG. 4 illustrates a comparison of example layouts for ruled type and corner cube type reflective arrays.
Figure 4:
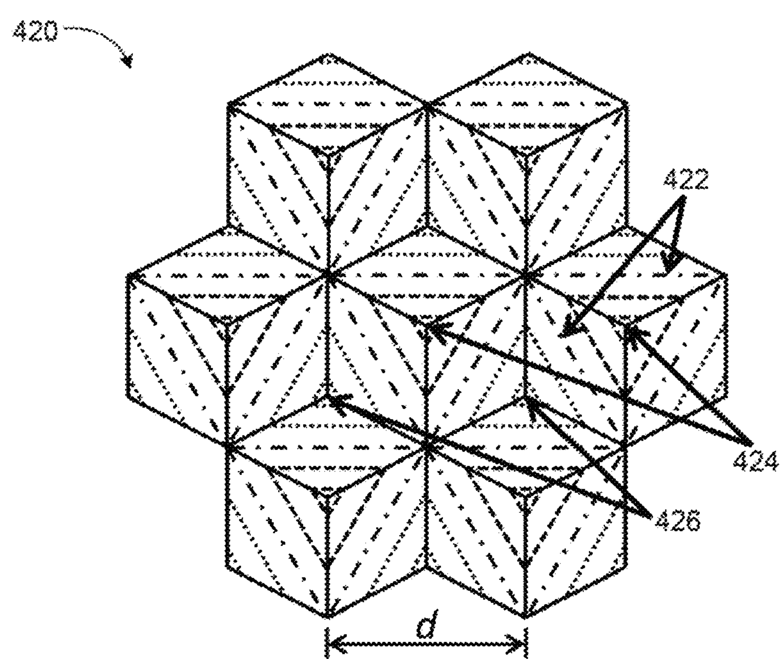

FIG. 4 illustrates a comparison of example layouts for ruled type and corner cube type reflective arrays.

Diagram 400 includes ruled retro-reflective array 410, where top cell edges 412 may be defined as z=(⅙)^0.5*d and bottom of retro-reflective pockets 414 may be defined as z=0. Diagram 400 also includes a full CCA 420, where facet median lines 422 may be defined as z=(⅙)^0.5*d, bottom of retro-reflective pockets 424 may be defined as z=0, and peaks 426 may be defined as z=(⅔)^0.5*d. d represents a pitch of the array in both cases. As shown in diagram 400, full sag height of CCA may be twice that of the ruled type retro-reflective array, and facet faces may contain twice the area for a same defined pitch d. These differences may affect the density of the light rays near reconvergence. Thus, impact of both diffraction point spread function (PSF) and geometric PSF may need to be determined in order to select the appropriate pitch to optimize both resolution and contrast for a floating image display system using either of these types of retro-reflective arrays.

FIG. 5A through 5F illustrate example diffraction PSF (log plots) comparison between full corner cube and ruled type arrays for various pitches.

Plots 502, 504, and 506 are example diffraction PSF plots for pitches 180 μm, 225 μm, and 270 μm, respectively, for a full CCA with a display length of 132 mm. Plots 512, 514, and 516 are example diffraction PSF plots for pitches 180 μm, 225 μm, and 270 μm, respectively, for a ruled type array with a display length of 132 mm. As mentioned above, performance of a floating image display, in terms of resolution and contrast, relies on selection of a suitable pitch. To select the suitable pitch, effect of diffraction angular spread may be considered as shown in the comparative plots of FIG. 5A through 5F. The selection of suitable pitch may also take into consideration image breakup due to finite pitch of the array. Example effects of the image breakup are shown in FIG. 5G.

Figure 5A:
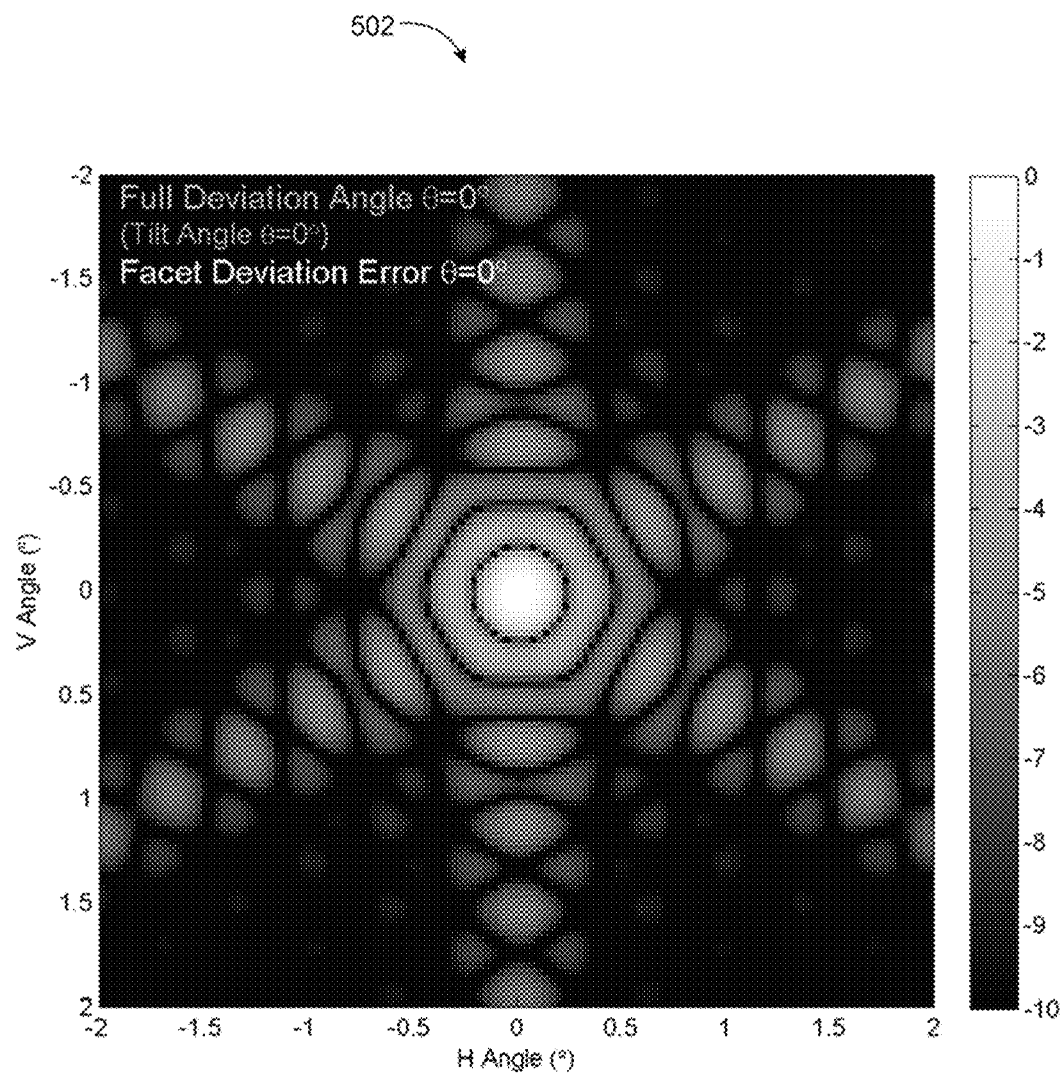
FIG. 5A through 5F illustrate example diffraction PSF (log plots) comparison between full corner cube and ruled type arrays for various pitches.
Figure 5B:
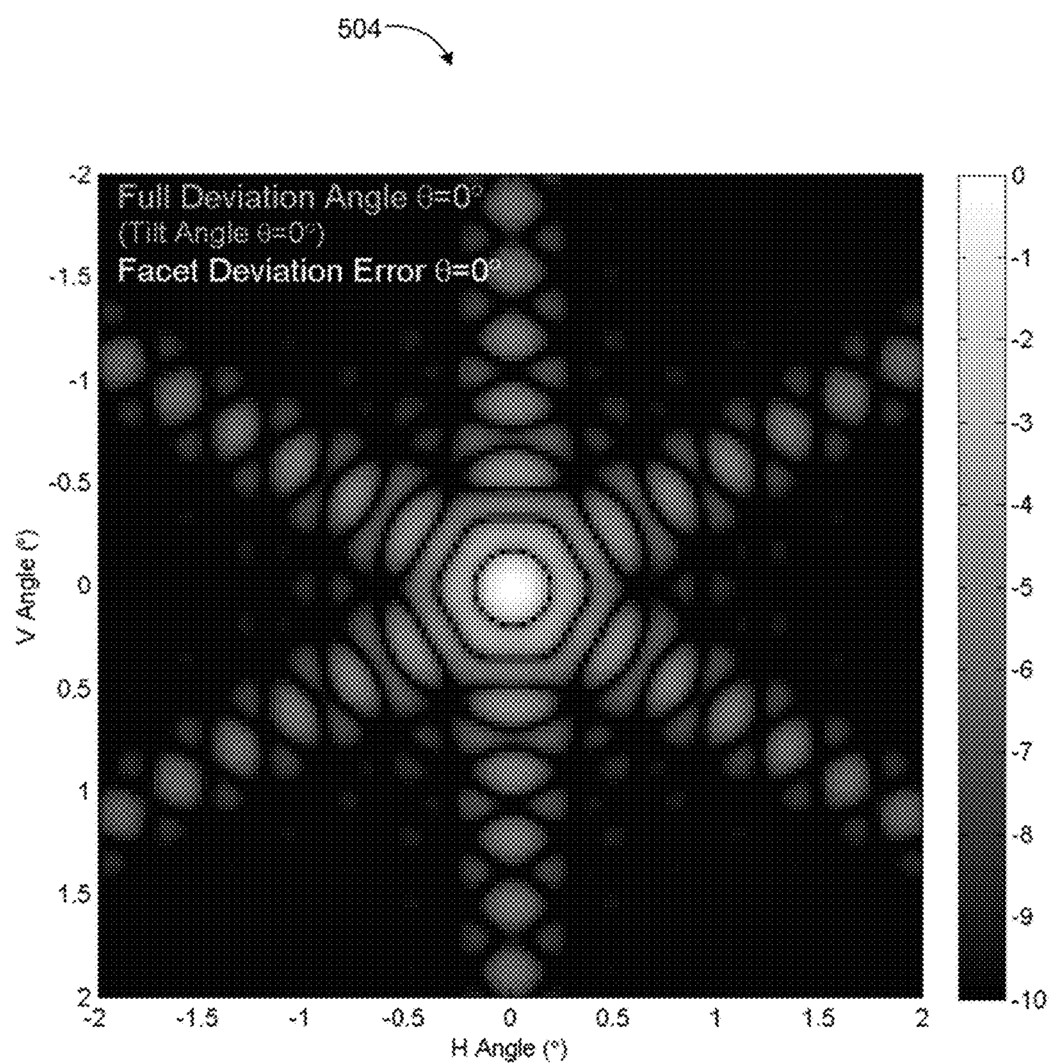
Figure 5C:
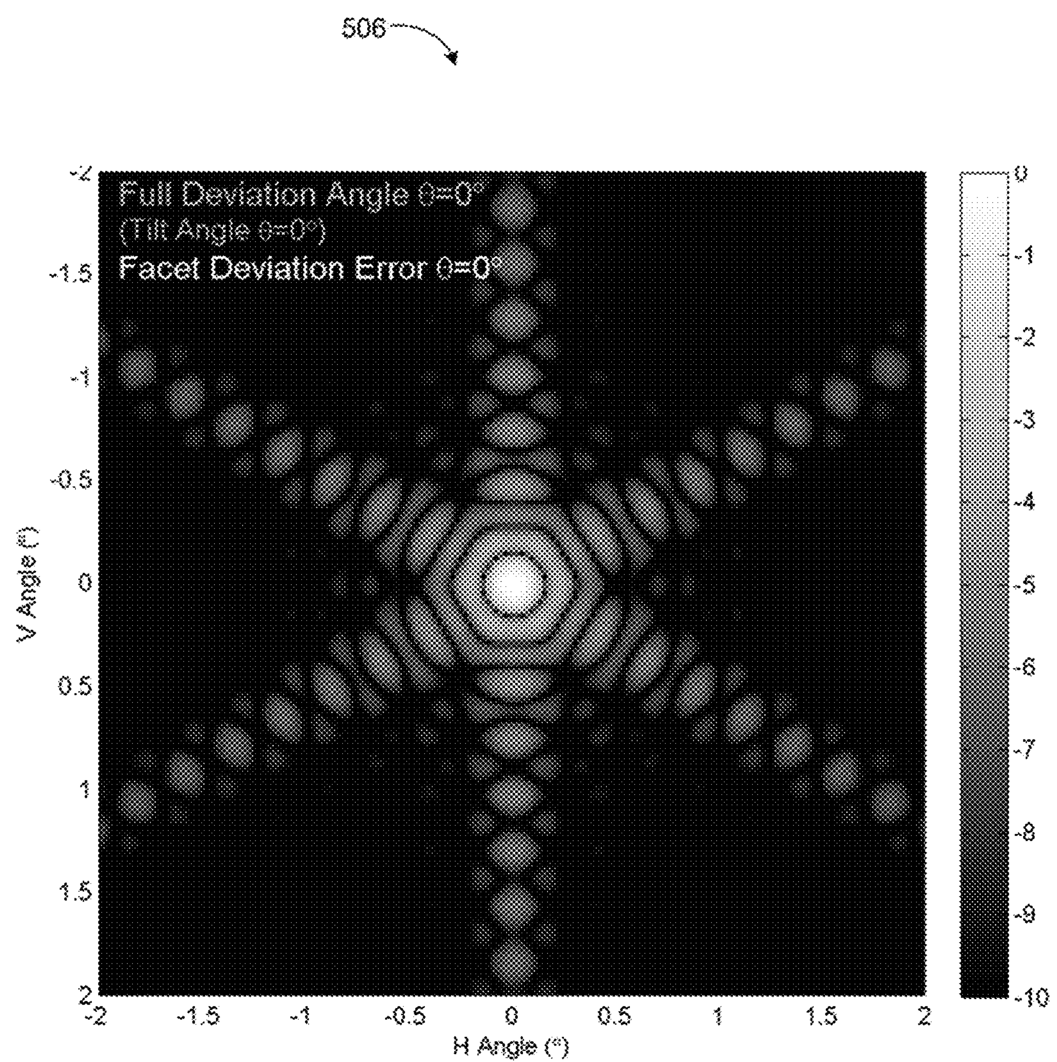
Figure 5D:
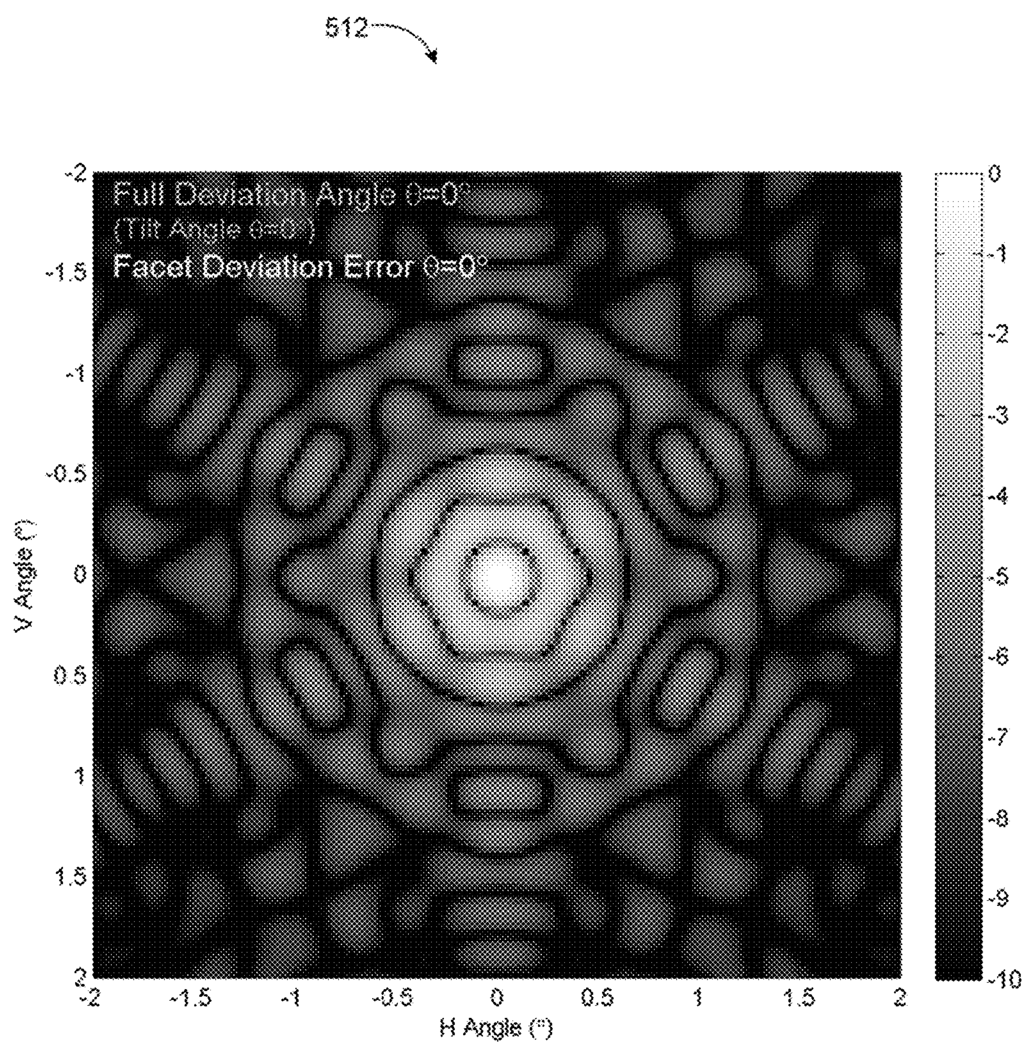
Figure 5E:
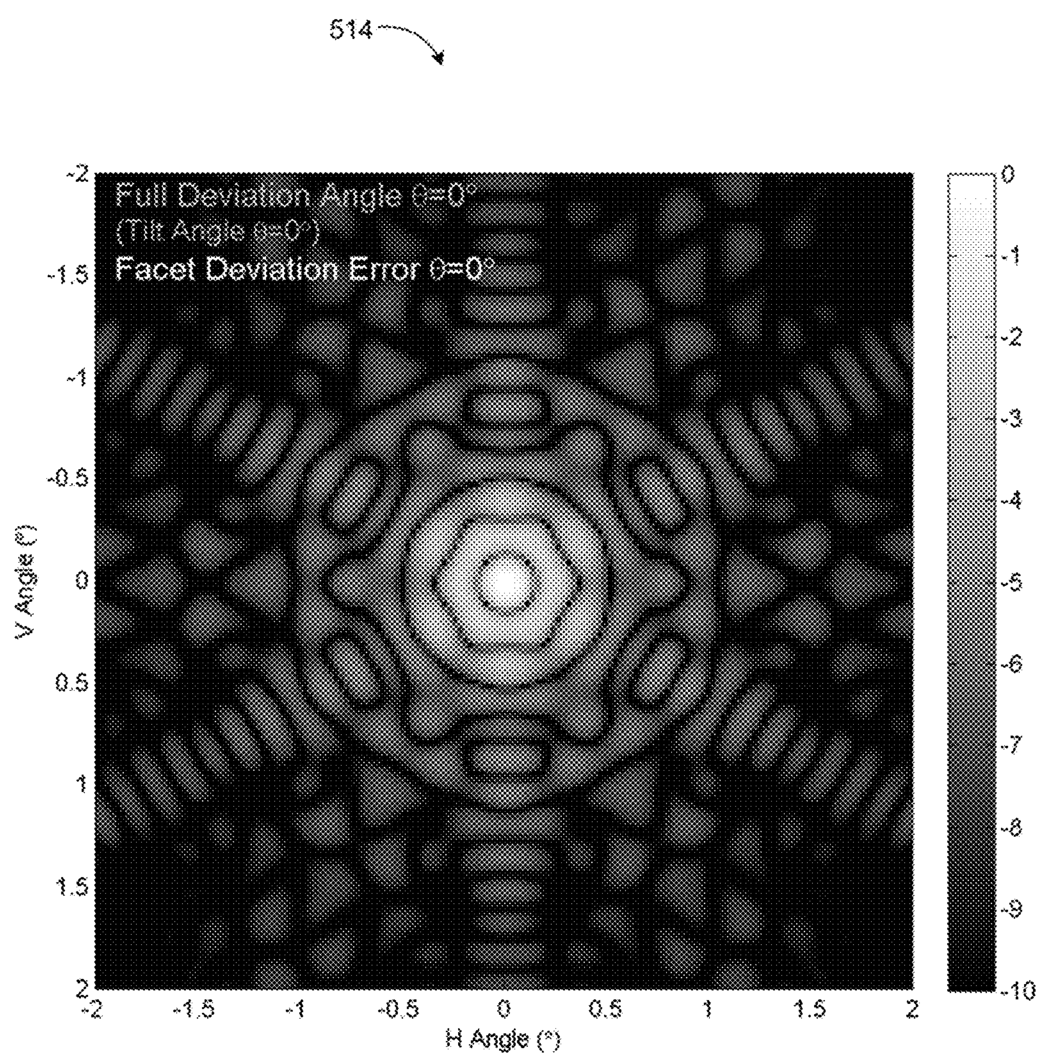
Figure 5F:
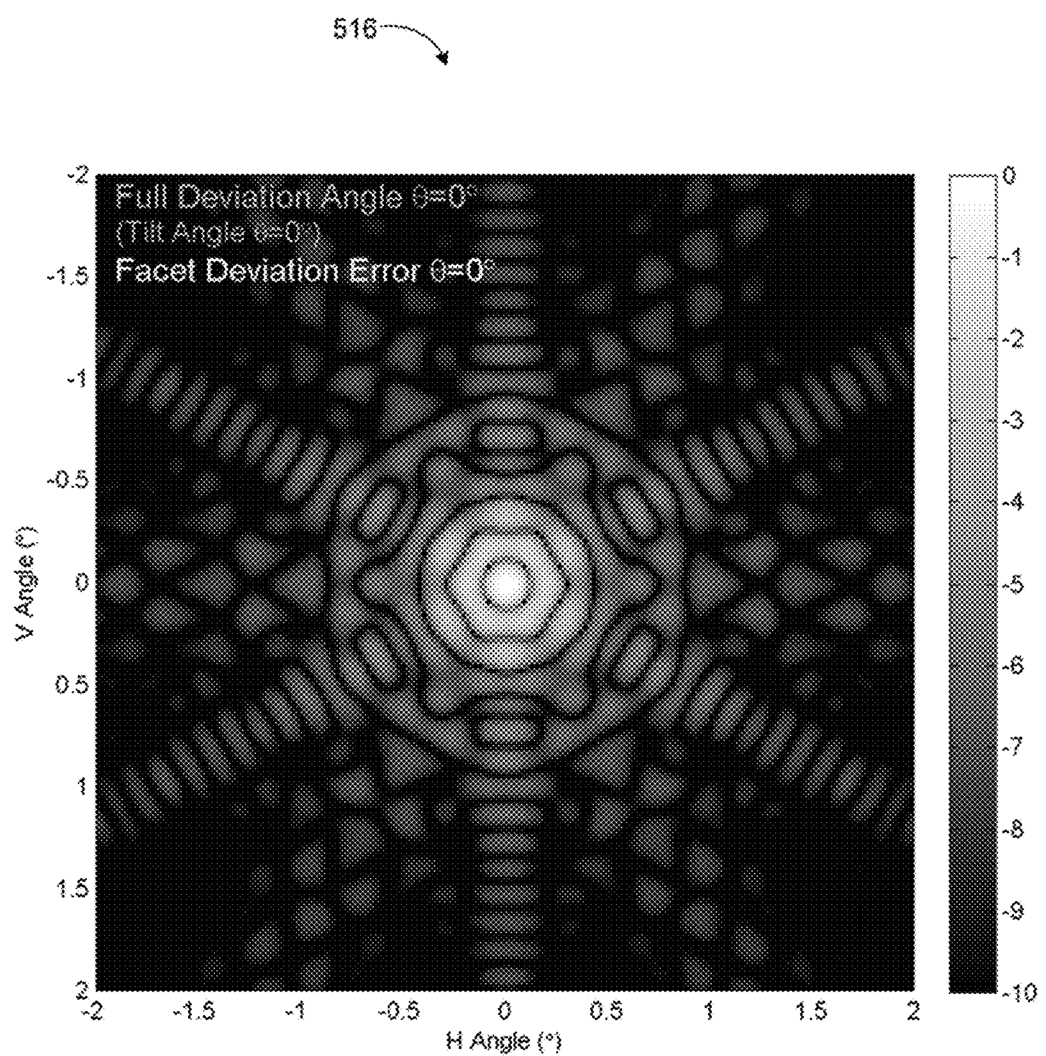
Figure 5G:
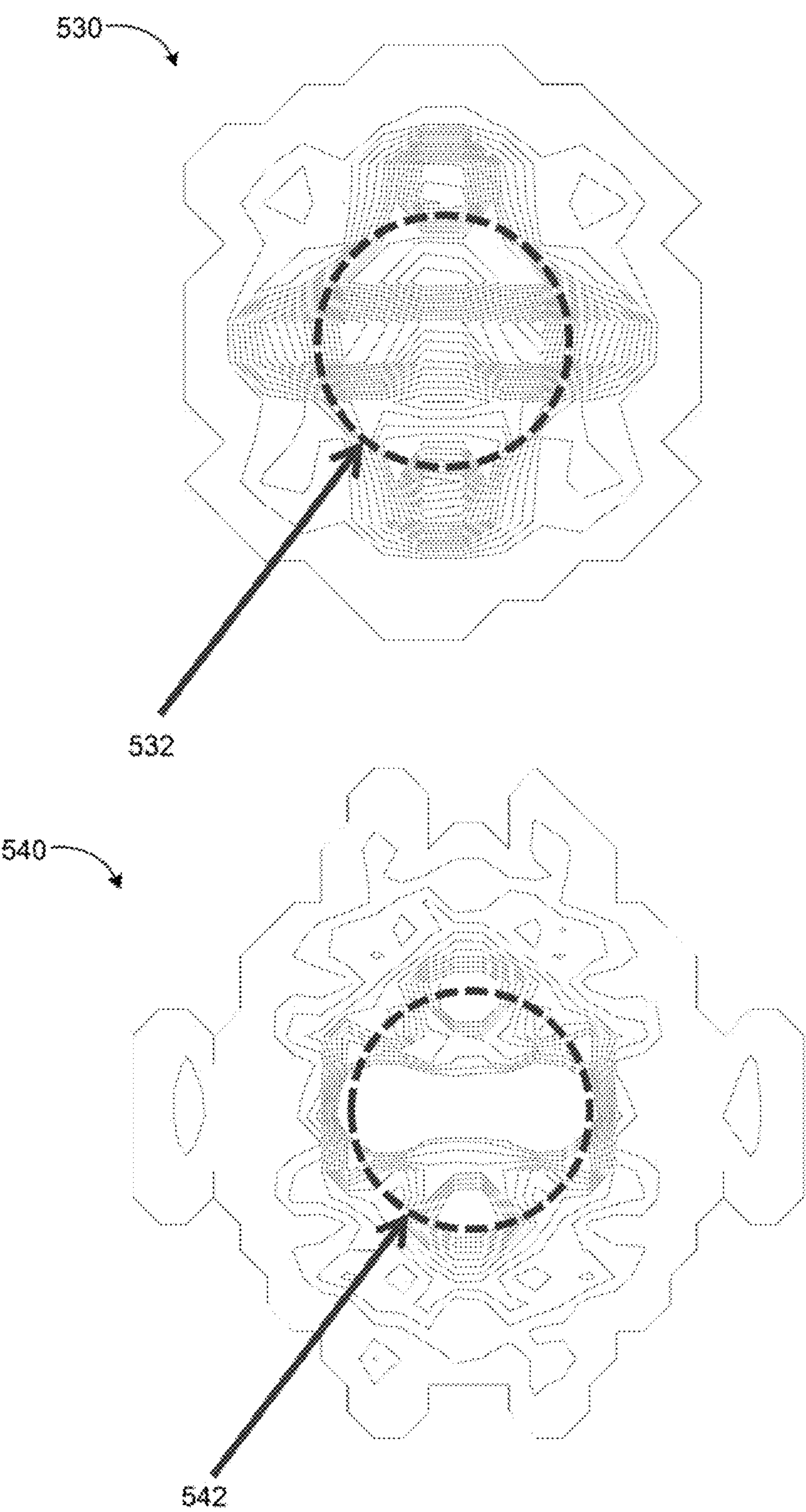
FIG. 5G illustrates a geometric PSF comparison between a full CCA and a ruled type array.
Figure 6A:
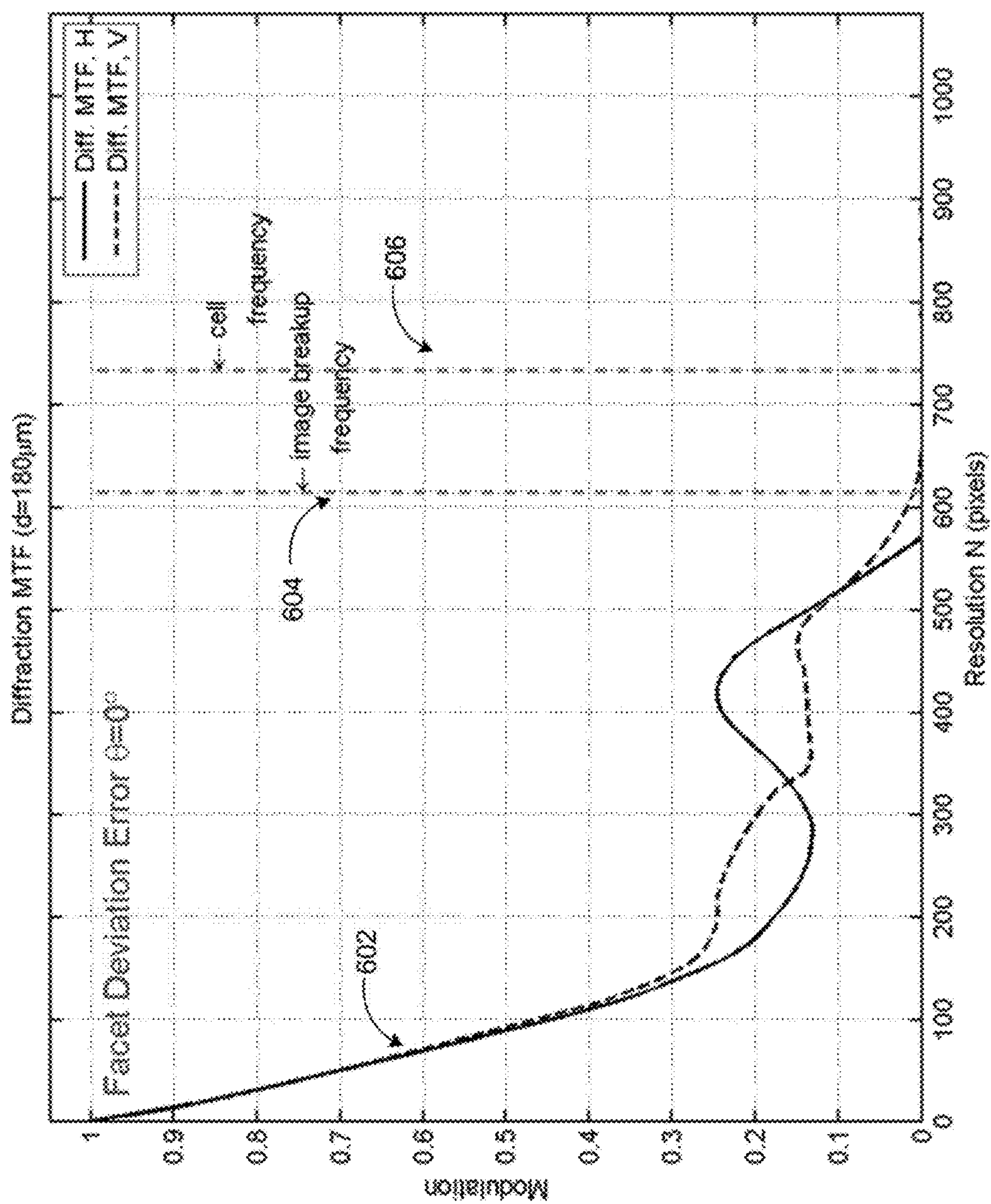
FIG. 6A through 6H illustrate example modulation transfer functions (MTFs) for ruled facets and CCA facets with four different pitch values.
Figure 6B:
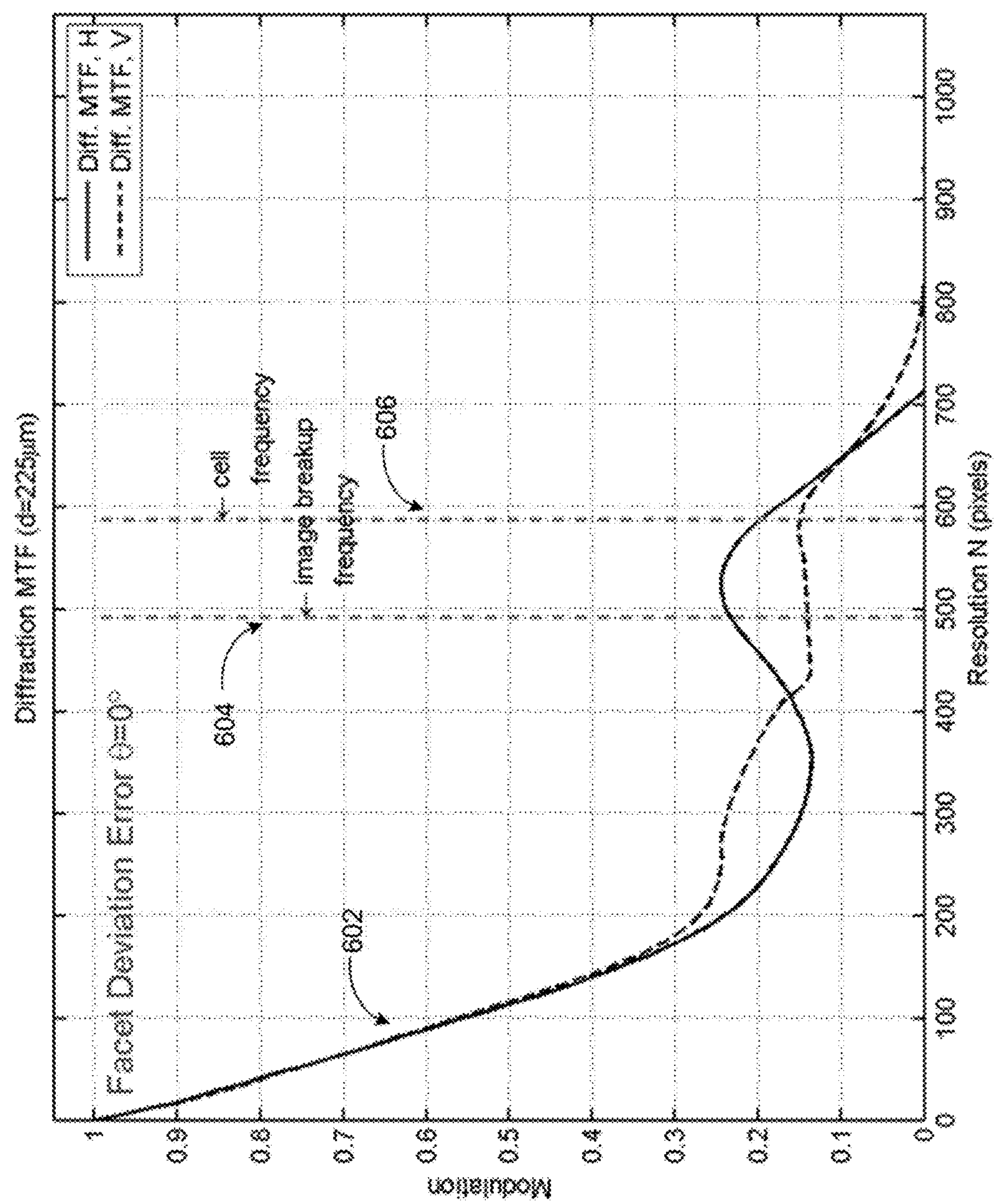
Figure 6C:
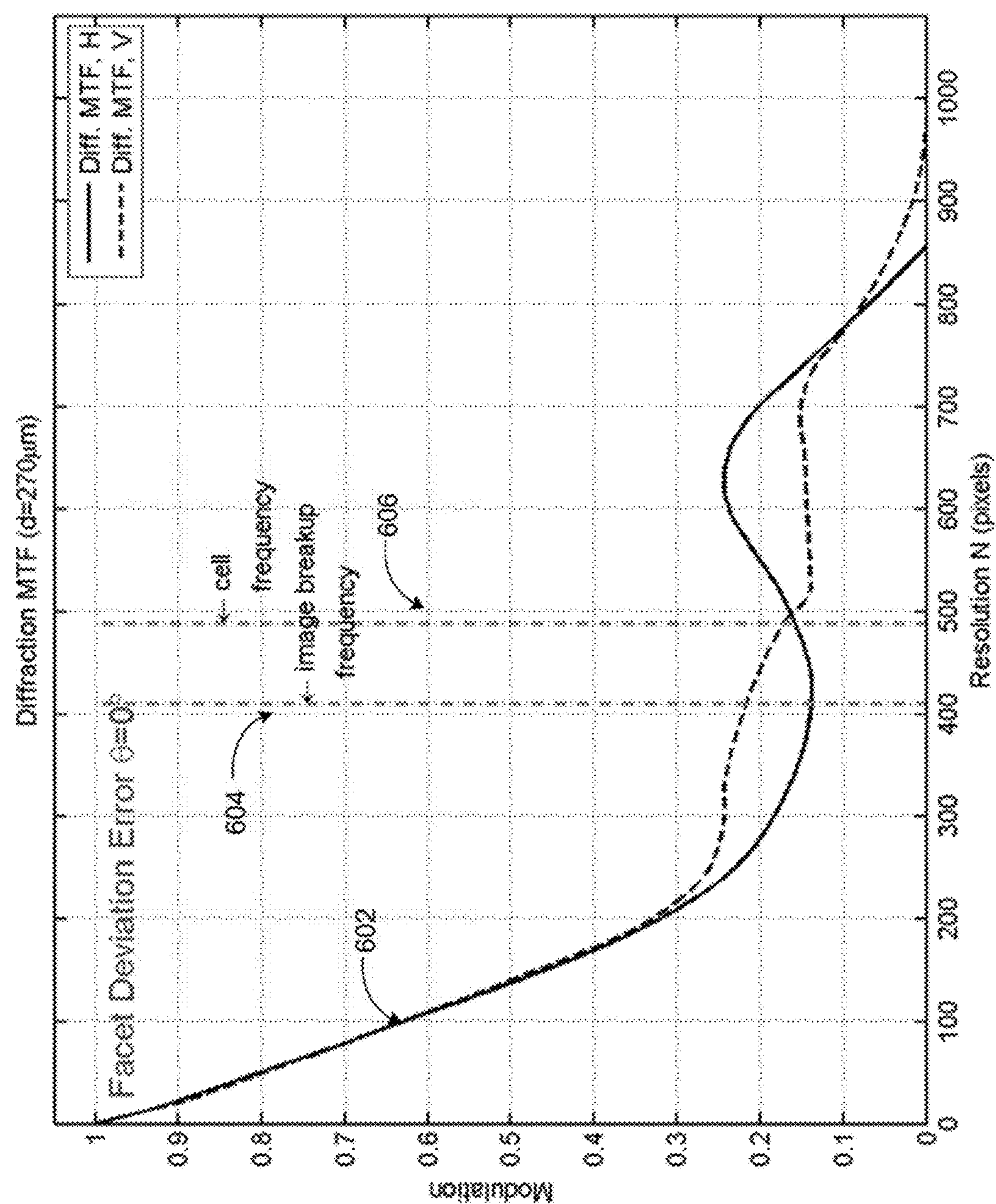
Figure 6D:
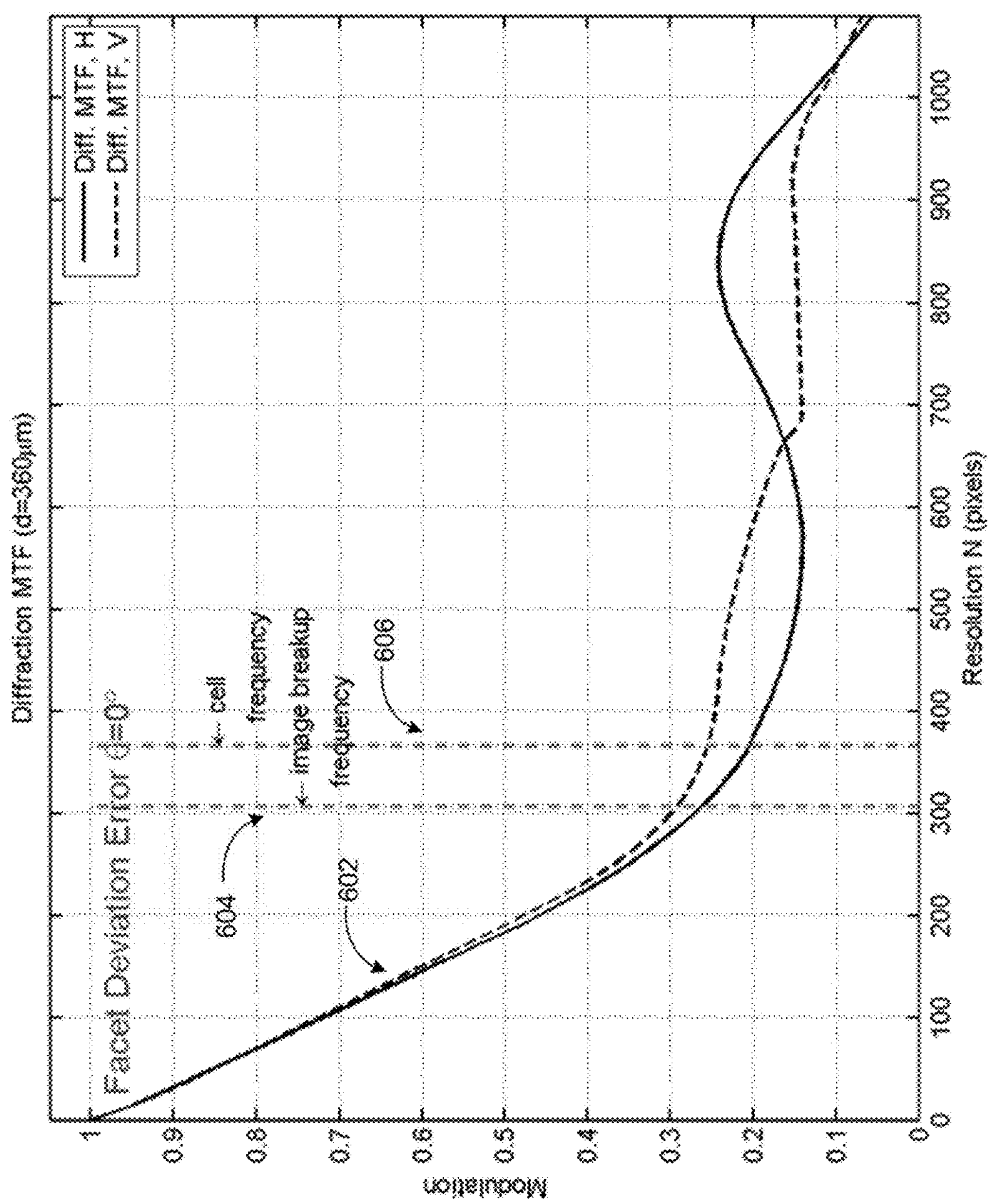
Figure 6E:
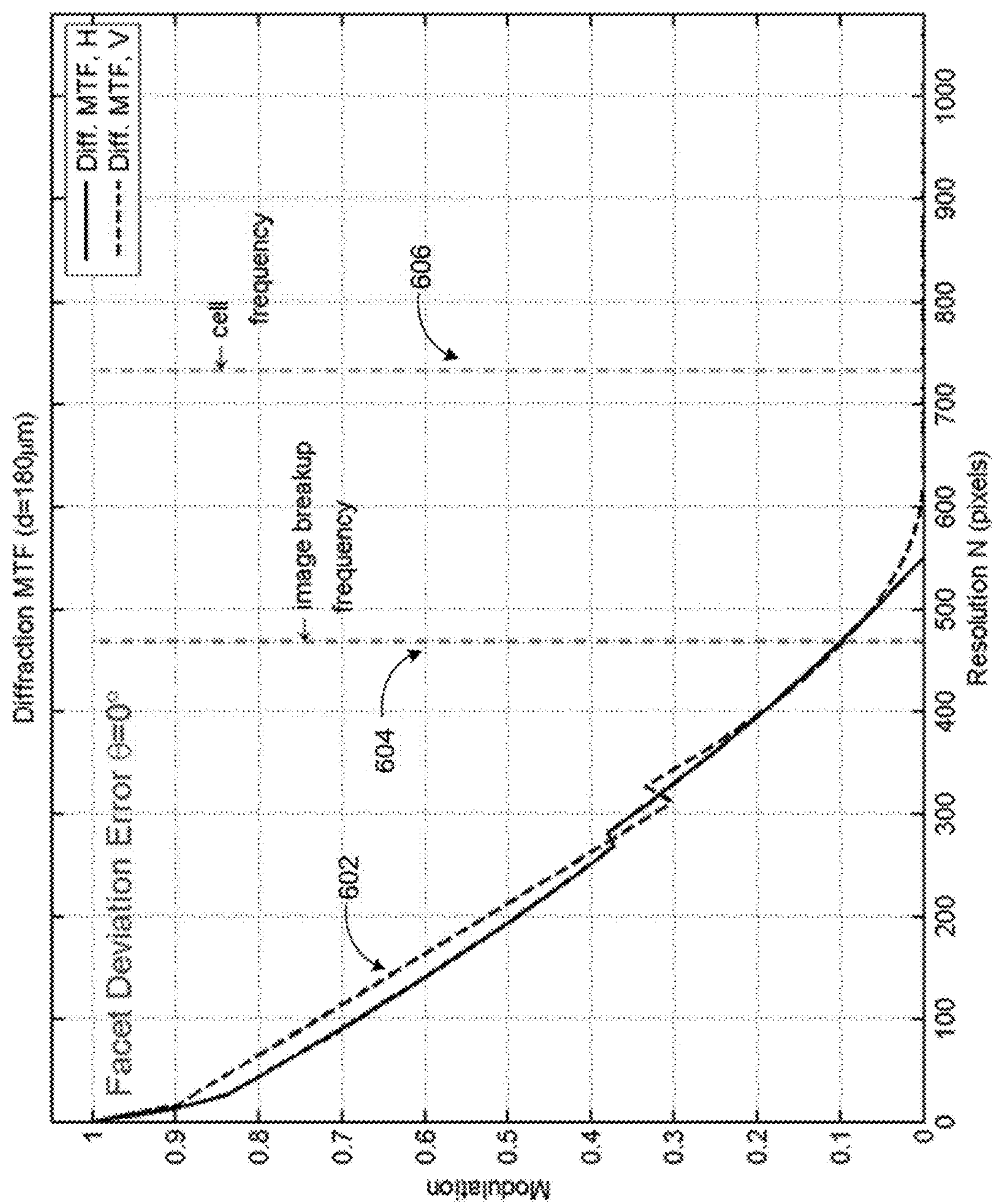
Figure 6F:
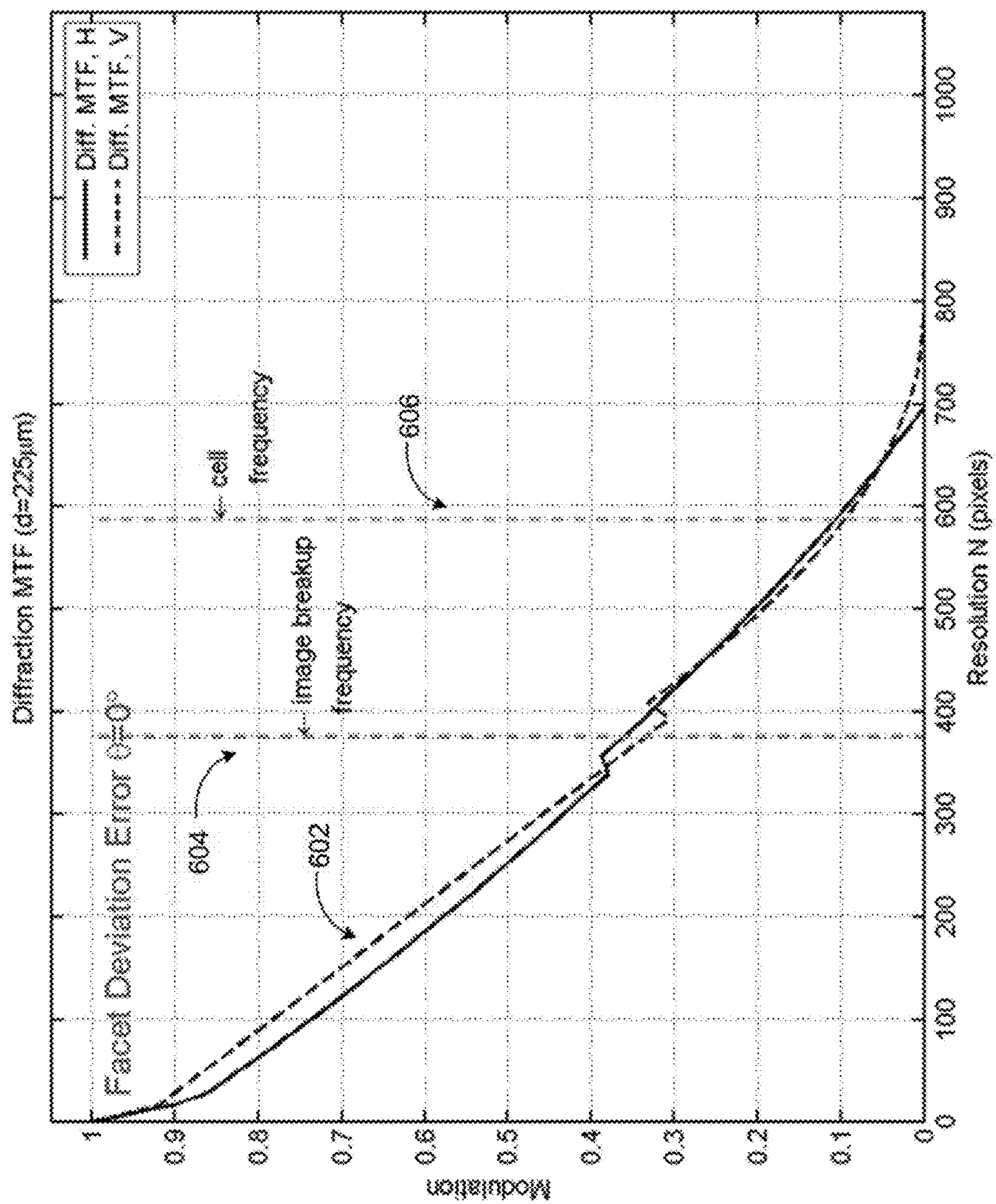
Figure 6G:
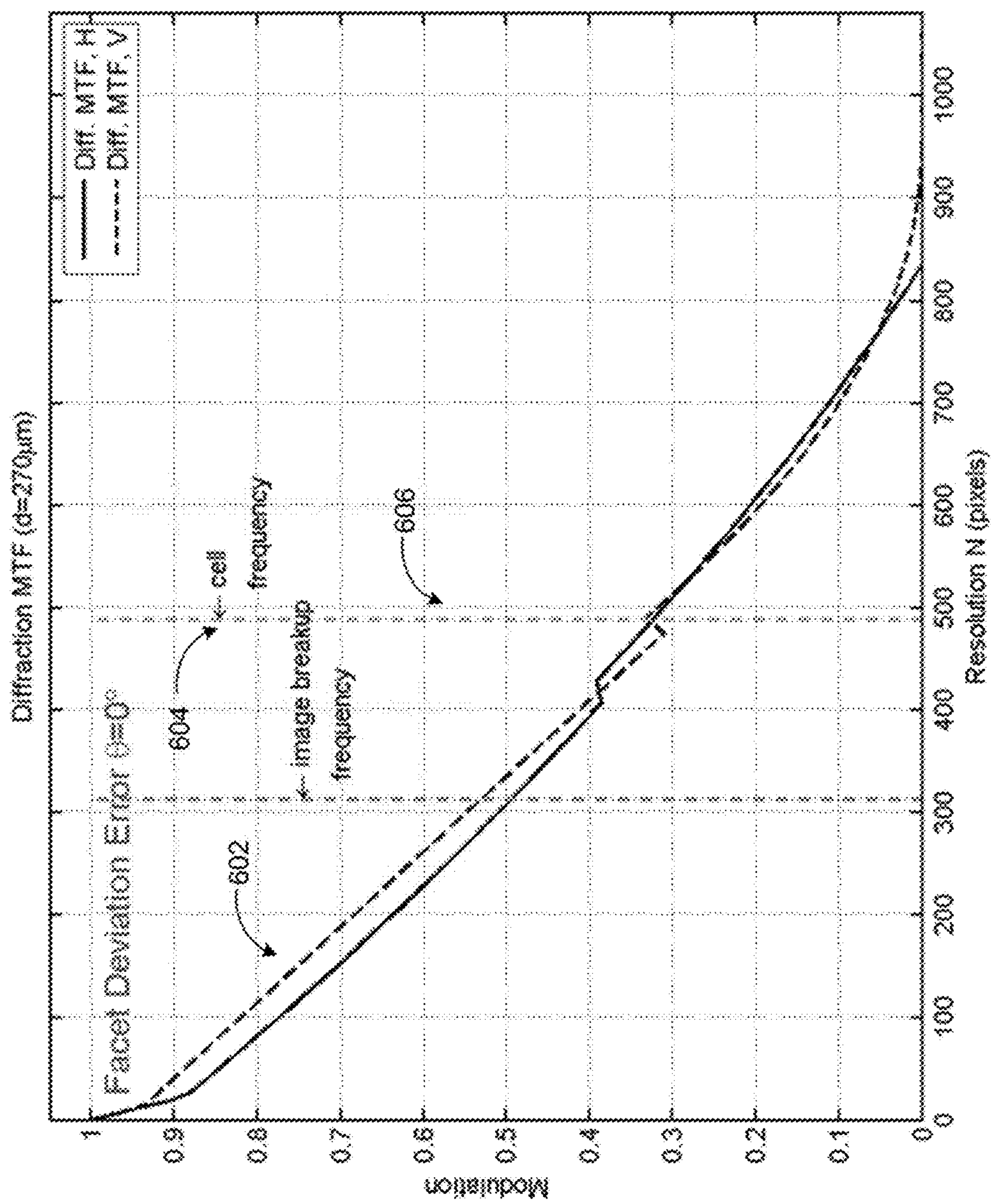
Figure 6H:
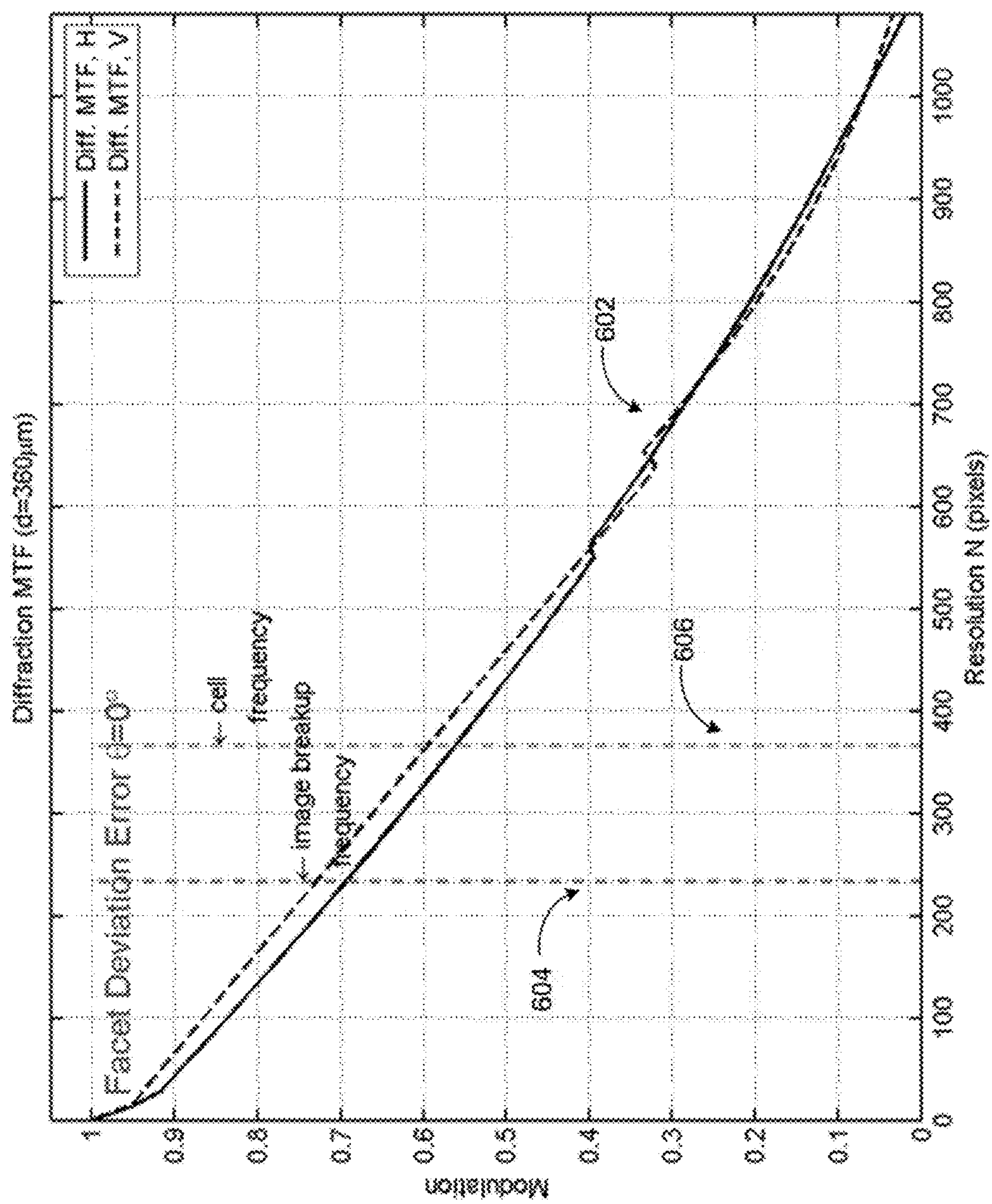

FIG. 5G illustrates a geometric PSF comparison between a full CCA and a ruled type array.

The geometric PSF plot 530 for the full CCA in FIG. 5G shows approximately 50% of the encircled energy 532 for spot size s≈1.192d, where the cutoff spatial frequency is approximately $SF_{cutoff}$≈1/(2*1.192d). In contrast, geometric PSF plot 540 for the ruled type array shows approximately 50% of the encircled energy 542 for s≈1.564d, where the cutoff spatial frequency is approximately $SF_{cutoff}$≈1/(2*1.564d). In both cases, the cutoff spatial frequency indicates the spatial frequency, in cycles per millimeter, within which display content may be supported by the display system.

Once the diffraction PSF, which emanates angularly over z distance, as well as geometric PSF, which forms a reconvergent spot size defined in terms of the 50% encircled energy, are determined to exhibit approximately equal contribution an optimized expected MTF may be assessed. The spot size, thereby, the geometric PSF may be adjusted selected by choice of pitch d, which may be selected based on a balance of both diffraction and geometric PSF, or diffractive angular spread and image breakup.

FIG. 6A through 6H illustrate example modulation transfer functions (MTFs) for ruled facets and CCA facets with four different pitch values.

In some implementations, appropriate choice of retro-reflective array type as well as appropriate pitch may be determined for minimizing resolution loss and maximizing possible resolution and MTF for a given input resolution and size in a retro-reflective display system. The impact of both diffraction and image breakup tradeoff may be taken into consideration in the pitch determination as described herein for both ruled type retro-reflective arrays as well as full CCAs. In some cases, the CCA pitch for similar MTF response may be in order of about 50% to 60% of the ideal pitch for ruled type usage, for example.

The diagrams in FIGS. 6A, 6B, 6C, and 6D show ruled type array diffraction MTFs in the presence of both diffraction and geometric PSF with modulation (vertical axis) versus resolution (horizontal axis) in terms of pixels for pitch values of 180 μm, 225 μm, 270 μm, and 360 μm, in each diagram, vertical lines 604 and 606 indicate image breakup frequency and cell frequency, respectively. The plots 602 include horizontal diffraction MTF (continuous) and vertical diffraction MTF (dashed).

For the case of a ruled type retro-reflector, the optimum pitch for desired MTF taking into account both diffraction and image breakup, for a tablet-size display having approximate vertical display dimension about 132 mm, may be between 200 μm and 250 μm, for example. Thus, the impact of example pitches on MTF due to diffraction spread and image breakup for a ruled type retro-reflective array may be seen in the diagrams of FIGS. 6A, 6B, 6C, and 6D.

The diagrams in FIGS. 6E, 6F, 6G, and 6H show CCA diffraction MTFs in the presence of both diffraction and geometric PSF with modulation (vertical axis) versus resolution (horizontal axis) in terms of pixel values for pitch values of 180 μm, 225 μm, 270 μm, and 360 μm. In each diagram, vertical lines 604 and 606 indicate image breakup frequency and cell frequency, respectively. The plots 602 include horizontal diffraction MTF (continuous) and vertical diffraction MTF (dashed). The impacts of example pitches on MTF due to diffraction spread and image breakup for a full corner cube type retro-reflective array can be seen in the diagrams of FIGS. 6E, 6F, 6G, and 6H.

The pixel content representing image breakup frequency is represented by a vertical dotted line which is proportional to the pixel content of the pitch or cell frequency. Cell frequency differs from image breakup frequency by a factor because it is more accurately the reconverged spot size that defines limitations of resolvability for each type array Because diffraction spread increases almost linear with distance z, and image breakup increases proportional to pitch d, an ideal floating image display system may have an optimum pitch that balances the impact of both diffraction as well as image breakup, and may further be represented independent of physical scale, such as pitch. In more general terms, the optimum pitch may also be represented as pixels, or resolvable pixel content or the contrast achievable at a given spatial frequency content represented by the number of resolvable pixels the display system can support, such that the result may be scaled for any size system for achieving optimum results. The ideal pitch for a ruled type array may typically be approximately 75% of the ideal pitch of a full corner cube type array. This ratio may be derived by considering the approximate spot size due to image breakup relative to each case as the diameter of the 50% encircled energy of a reconverged spot.

Relative to pitch as defined in illustration of layouts in FIG. 4 for both type arrays, the 50% encircled energy spot sizes may be s~1.192d for ruled type and s~1564d for full corner cube type, as discussed previously. The logarithm of intensity angular spread of PSF, due to diffraction, for given pitch arrays of both types having zero facet angle error, may be cleaner for the full CCA than that of ruled type. This may explain why the MTF response for ruled type array drops around the mid-spatial frequencies due to reduced contrast.

For the case of vertical display size on order of 132 mm, a good balance between diffraction and image breakup may occur between 200 μm and 250 μm for ruled type array and between 160 μm and 200 μm for full corner cube type array, for example. The diagrams in FIG. 6A through 6H are for a facet deviation error of zero degrees.

FIG. 7A through 7D illustrate comparison between MTS for ruled and CCA facets with two different pitch values.

Figure 7A:
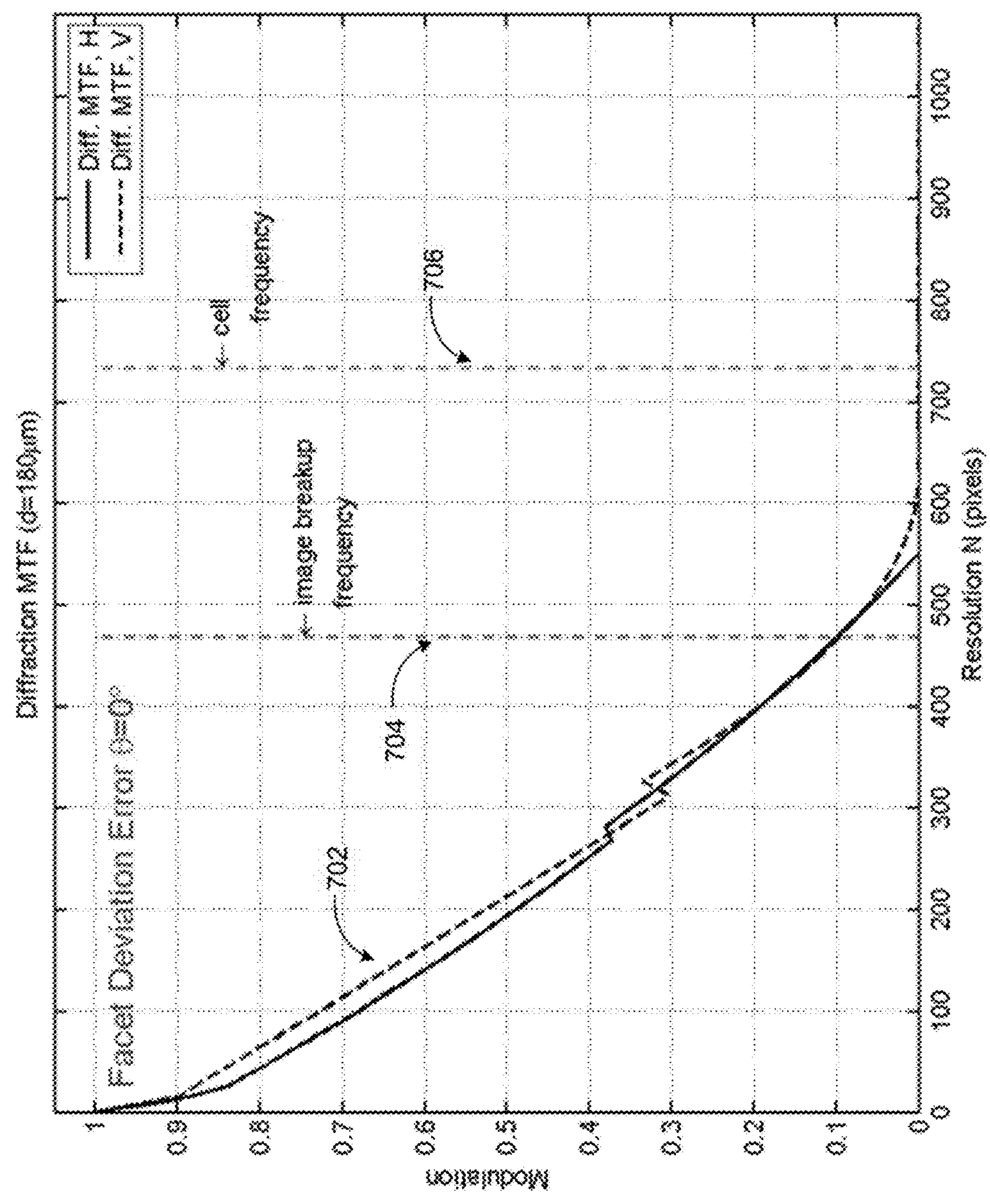
FIG. 7A through 7D illustrate comparison between MTS for ruled and CCA facets with two different pitch values.
Figure 7B:
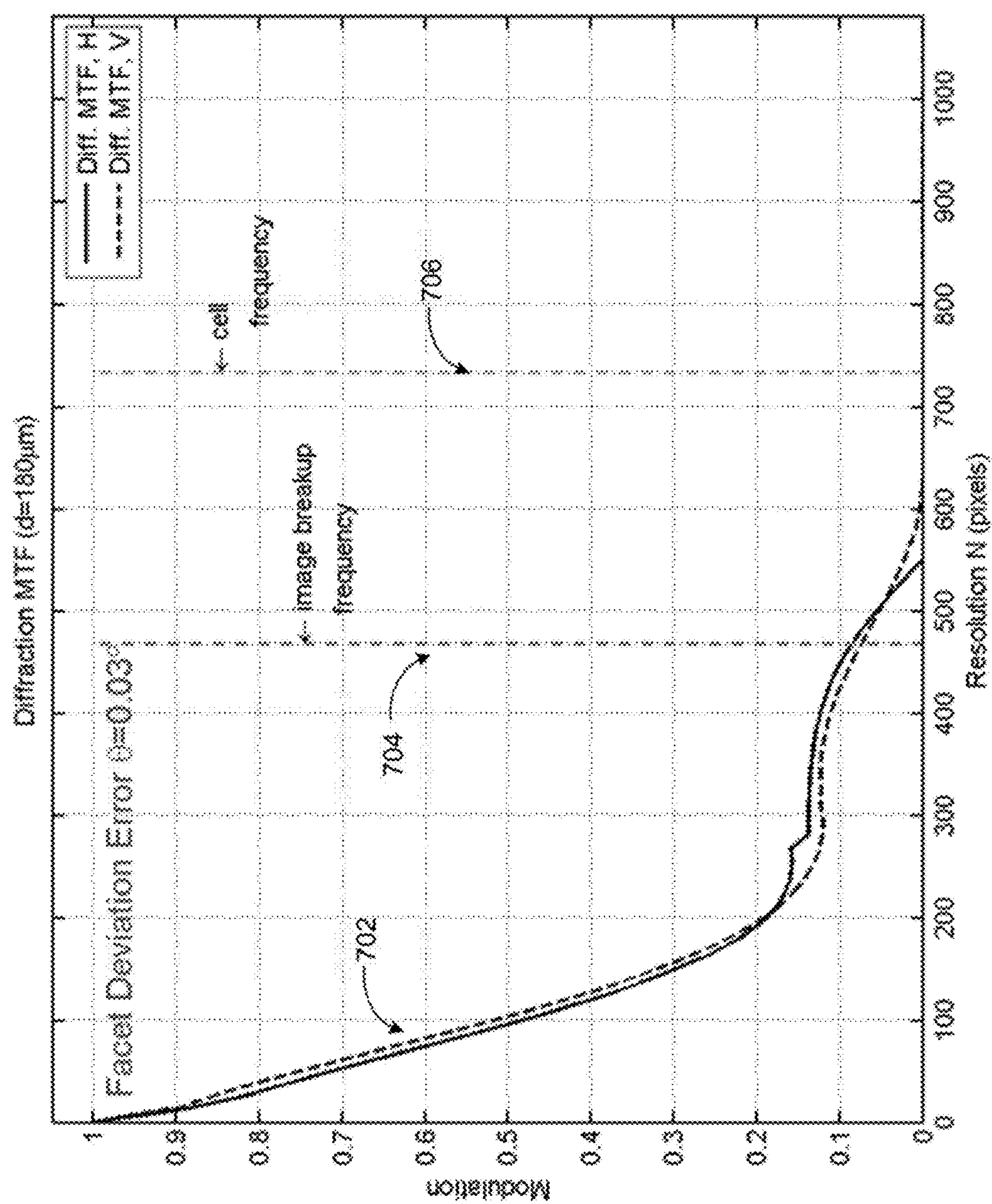
Figure 7C:
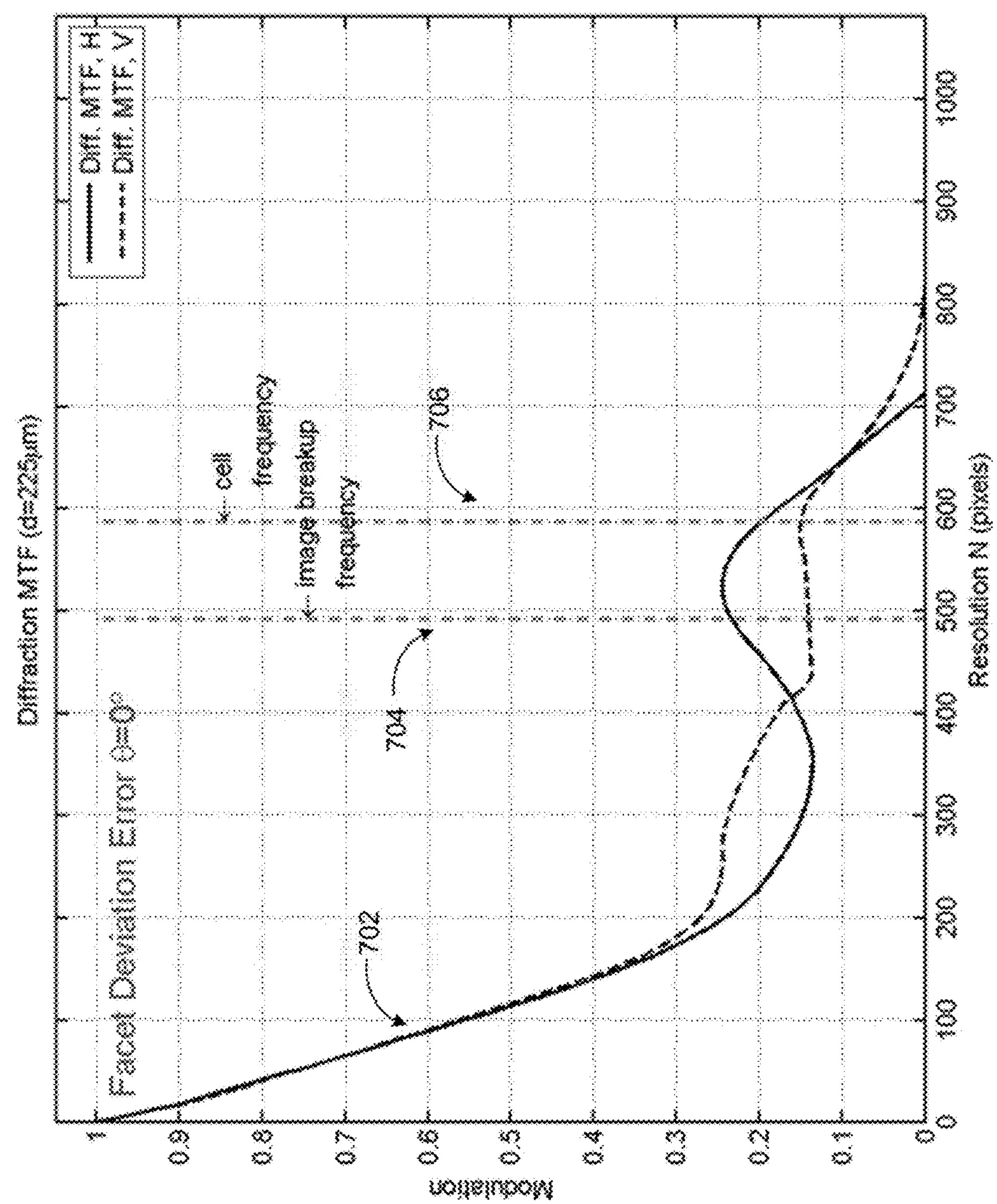
Figure 7D:
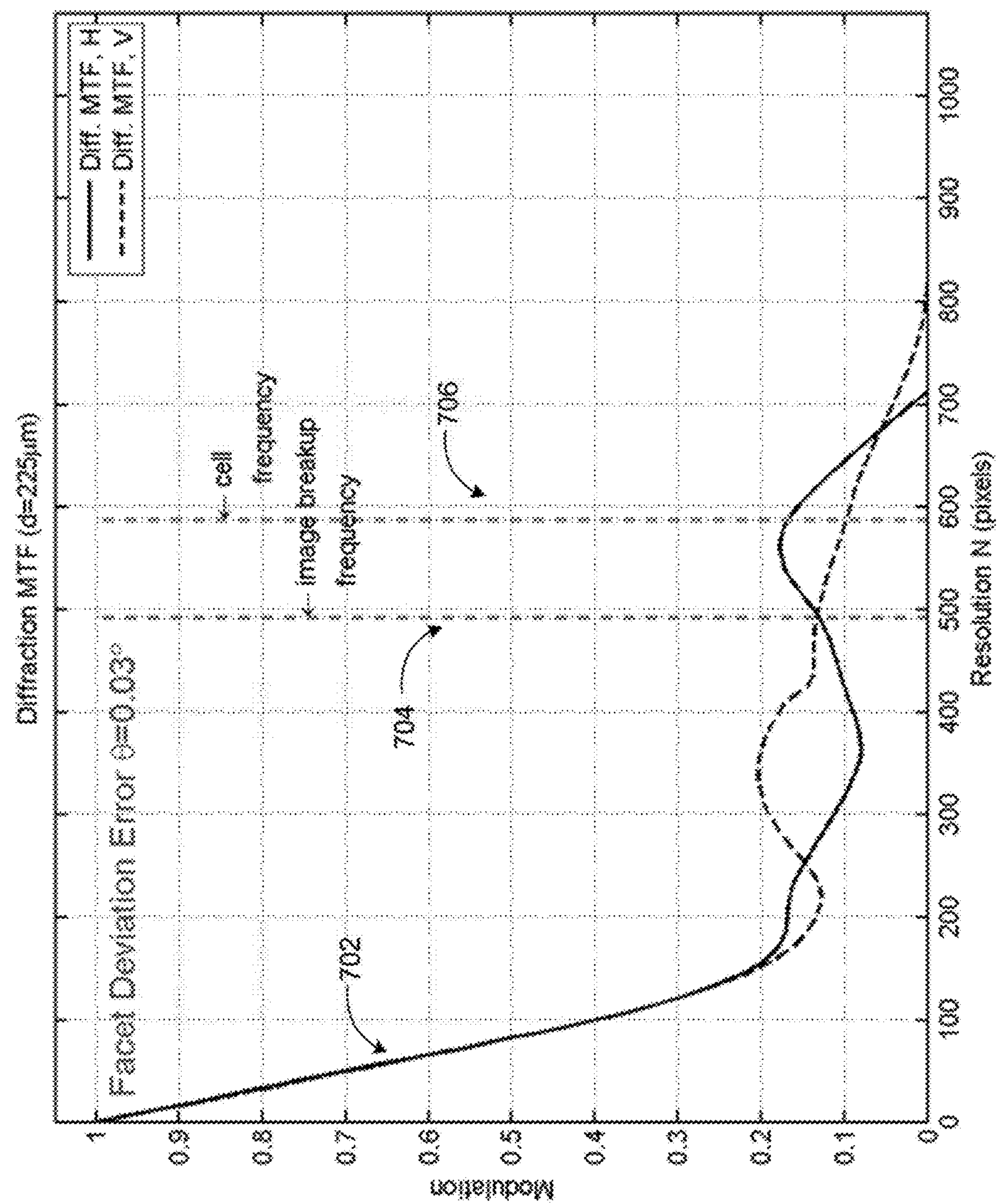

The MTF diagrams of FIGS. 7A and 7B show diffraction MTF plots 702 (continuous curve horizontal, dashed curve vertical) for the full CCA with a pitch value of 180 μm with zero degree and 0.03 degree facet angle error, respectively. The MTF diagrams of FIGS. 7C and 7D show diffraction MTF plots 702 (continuous curve horizontal, dashed curve vertical) for the ruled type array with a pitch value of 225 μm with zero degree and 0.03 degree facet angle error, respectively. Both sets of diagrams include image breakup frequency 704 and cell frequency 706. For facet angle errors above 0.03 degrees, the MTF drops dramatically for both array types.

Figure 8:
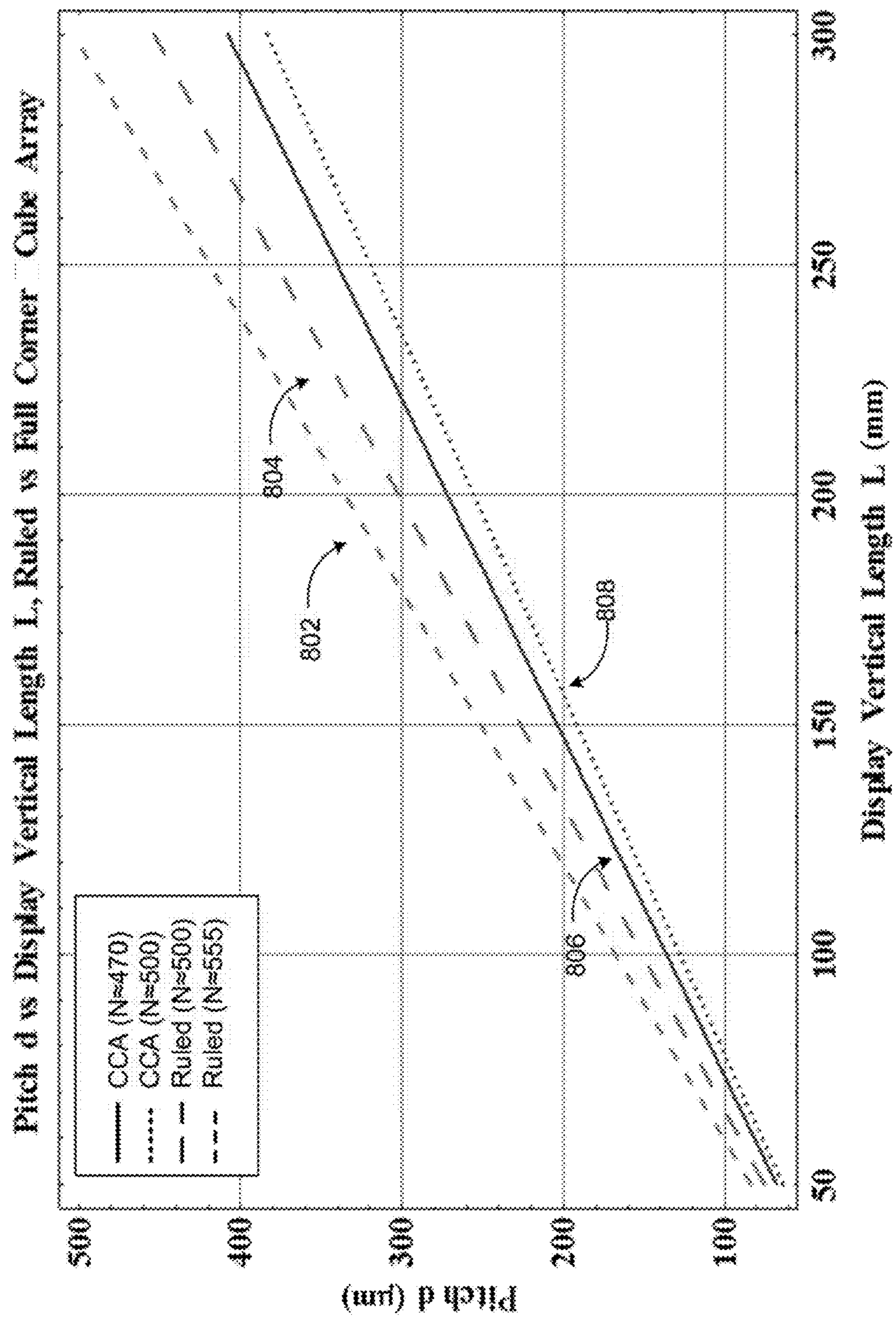
FIG. 8 illustrates an ideal pitch target zone comparison between full corner cube and ruled type arrays for various vertical display lengths.

FIG. 8 illustrates an ideal pitch target zone comparison between full corner cube and ruled type arrays for various vertical display lengths.

The pitch versus display vertical length diagram in FIG. 8 represents example ranges of ideal pitch for both types of arrays, for various sizes of display vertical length L. The ideal pitch for the CCA array may be defined as $d_{CCA} \approx L/(1.564*N)$, where N may vary between 470 and 500. The ideal pitch for the ruled type array may be defined as $d_{rules} \approx L/(1.192*N)$, where N may vary between 500 and 555. Both of these target design regions may offer on order of 500 pixels of resolvable content along the vertical dimension of the display. The display vertical length L is used as a basis of comparison because it is the dimension of the display object that dictates geometry of the display based on a tilt of the splitter mirror of approximately 45 degrees. Once the vertical geometry is determined—the vertical geometry dictating ideal pitch—the size of array in horizontal may be determined independently based on desired view angle the display needs to support. If the z distance of the object to splitter is increased substantially, e.g., to push out the floating display placement in a z direction toward user, then diffraction spread increases, such that the dimension L must be increased to properly represent the design layout. Use of blank borders then may only serve to reduce the maximum number of pixels having content because the pitch is determined based on display size. In FIG. 8, curves 806 and 808 show the full CCA ideal pitches (versus display vertical length) for N=500 and N=555, while curves 802 and 804 show the ruled type array ideal pitches for N=470 and N=500.

In addition to readable text presentation in floating image displays, resolution of retro-reflective systems may be enhanced through the implementation precise ruled or corner cube reflectors such that user interactions with virtual display applications are not limited to finger touch. Smaller objects such as pens or pointers may also be usable because higher resolution icons, having either more detail or smaller size, may be utilized with reasonable MTF resolution.

The examples in FIG. 1 through 8 have been described with specific systems including specific apparatuses, components, component configurations, and component tasks. Implementations are not limited to systems according to these example configurations. Increased accuracy corner cube arrays for high resolution retro-reflective imaging applications may be implemented in configurations using other types of systems including specific apparatuses, components, component configurations, and component tasks in a similar manner using the principles described herein.

Figure 9:
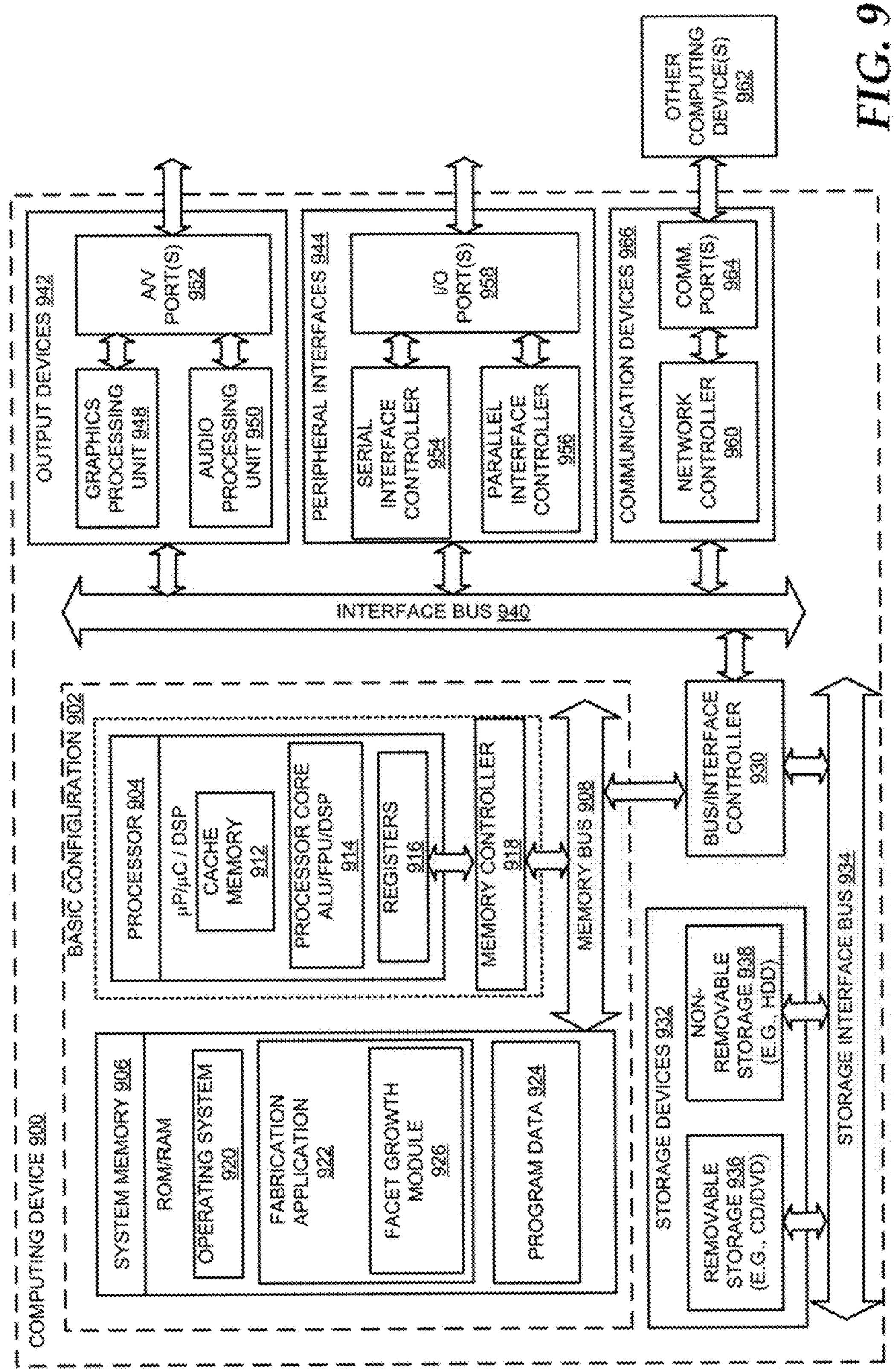
FIG. 9 is a block diagram of an example computing device that may be used to control a fabrication system for ruled reflective facets for use in retro-reflective imaging systems.

FIG. 9 and the associated discussion are intended to provide a brief, general description of a suitable computing environment in which implementations may be used.

For example, the computing device 900 may be used in conjunction with a fabrication system for increased accuracy corner cube arrays for high resolution retro-reflective imaging applications. Computing device 900 may also be used to provide content to a display based on the retro-imaging devices described herein. In an example of a basic configuration 902, the computing device 900 may include one or more processors 904 and a system memory 906. A memory bus 908 may be used for communication between the processor 904 and the system memory 906. The basic configuration 902 may be illustrated in FIG. 9 by those components within the inner dashed line.

Depending on the desired configuration, the processor 904 may be of any type, including, but not limited to, a microprocessor (μP), a microcontroller (μC), a digital signal processor (DSP), or any combination thereof. The processor 904 may include one more levels of caching, such as a level cache memory 912, a processor core 914, and registers 916. The processor core 914 may include an arithmetic logic unit (ALU), a floating point unit (FPU), a digital signal processing core (DSP Core), or any combination thereof. A memory controller 918 may also be used with the processor 904, or in some implementations, the memory controller 918 may be an internal part of the processor 904.

Depending on the desired configuration, the system memory 906 may be of any type including but not limited to volatile memory (such as RAM), non-volatile memory (such as ROM, flash memory, etc.), or any combination thereof. The system memory 906 may include an operating system 920 suitable for controlling the operation of the platform, such as the WINDOWS®, WINDOWS MOBILE®, WINDOWS RT®, or WINDOWS PHONE®, and similar operating systems from MICROSOFT CORPORATION of Redmond, Wash. The system memory 906 may further include a fabrication application 922, a facet growth module 926, and a program data 924. The fabrication application 922 may control various aspects of retro-reflective array fabrication such as wafer processing, polishing, layering, cutting, and so on. The facet growth module 926 may control, for example, selective epitaxial growth of silicon to form the desired CCAs with facet angle errors less than 0.03 deg.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 906, the removable storage devices 936, and the non-removable storage devices 938 may be examples of computer storage media. Computer storage media may include, but may not be limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (for example, one or more output devices 942, one or more peripheral interfaces 944, and one or more communication devices 966) to the basic configuration 902 via the bus/interface controller 930. Some of the example output devices 942 may include a graphics processing unit 948 and an audio processing unit 950, which may be configured to communicate to various external devices, such as a display or speakers via one or more A/V ports 952. One or more example peripheral interfaces 944 may include a serial interface controller 954 or a parallel interface controller 956, which may be configured to communicate with external devices, such as input devices (for example, keyboard, mouse, pen, voice input device, touch input device, etc.) or other peripheral devices (for example, printer, scanner, etc.) via one or more I/O ports 958. An example communication device 966 may include a network controller 960, which may be arranged to facilitate communications with one or more other computing devices 962 over a network communication link via one or more communication ports 964. The one or more other computing devices 962 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 900 may be implemented as a part of a general purpose or specialized server, mainframe, or similar computer, which includes any of the above functions. The computing device 900 may also be implemented as a personal computer including both laptop computer and non-laptop computer configurations.

Figure 10:
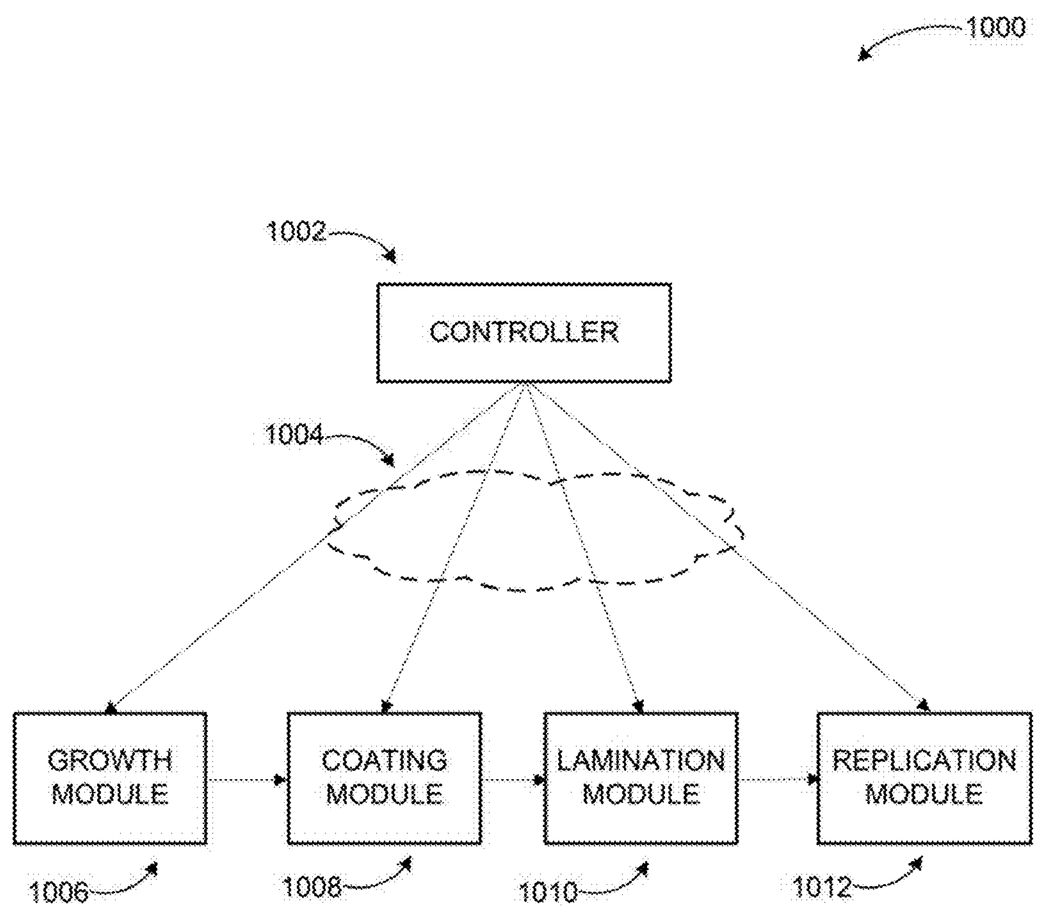
FIG. 10 illustrates an example system for fabrication of ruled reflective facets for use in retro-reflective imaging systems.

FIG. 10 illustrates an example system for fabrication of ruled reflective facets for use in retro-reflective imaging systems.

According to some implementations, a ruled reflective facet based retro-reflective array fabrication system may include a growth module 1006, a coating module 1008, a lamination module 1010, and a replication module 1012. A controller 1003 may control and coordinate actions of the various fabrication modules through wired or wireless communication with the modules, for example, over the cloud 1004.

The growth module 1006 may be configured to employ selective epitaxial growth to form a plurality of corner cube structures on a wafer. The coating module 1008 may be configured to apply reflective coating to one of facets of the plurality of corner cube structures to form a first surface reflector or to a backside of a clear substrate formed over the plurality of corner cube structures using a clear resin to form a second surface reflector. The controller 1002 may also be configured to determine a pitch for the corner cube structures based on a tradeoff of a diffraction and an image breakup caused by the retro-reflective array.

The lamination module 1010 may be configured to apply a clear resin layer over the plurality of corner cubes and apply an anti-reflective coating on the substrate. The replication module 1012 may be configured to fabricate multiple replicas of a master tile cut from the wafer and tile the replicas to form a larger new master tile. The replication module 1012 may fabricate the multiple replicas through replication in a polymer sheet or an electroform nickel. The replication module 1012 may tile the replicas by cutting and sizing through one or more of milling, grinding, polishing, and electron discharge machining (EDM).

The replication module 1012 may also be configured to fabricate mold inserts for high volume replication and control heating of surface layers of the mold inserts for embossing by employing one or more from a list consisting of the following: induction heating, flash steam heating and cooling fluids. The growth module 1006 may form the plurality of corner cube structures on the wafer through selective epitaxial growth of silicon of the <111> oriented silicon wafer. The growth module may also form the plurality of corner cube structures on the wafer through vapor selective epitaxial growth using materials selected from a list consisting of the following: trichlorisilane, hydrogen-chloride, and hydrogen gas.

Example implementations also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program. Alternatively or additional, components or steps described with respect to computing device 900 may be located or performed in a networked computer in a cloud-computing environment, for example, a data center.

Figure 11:
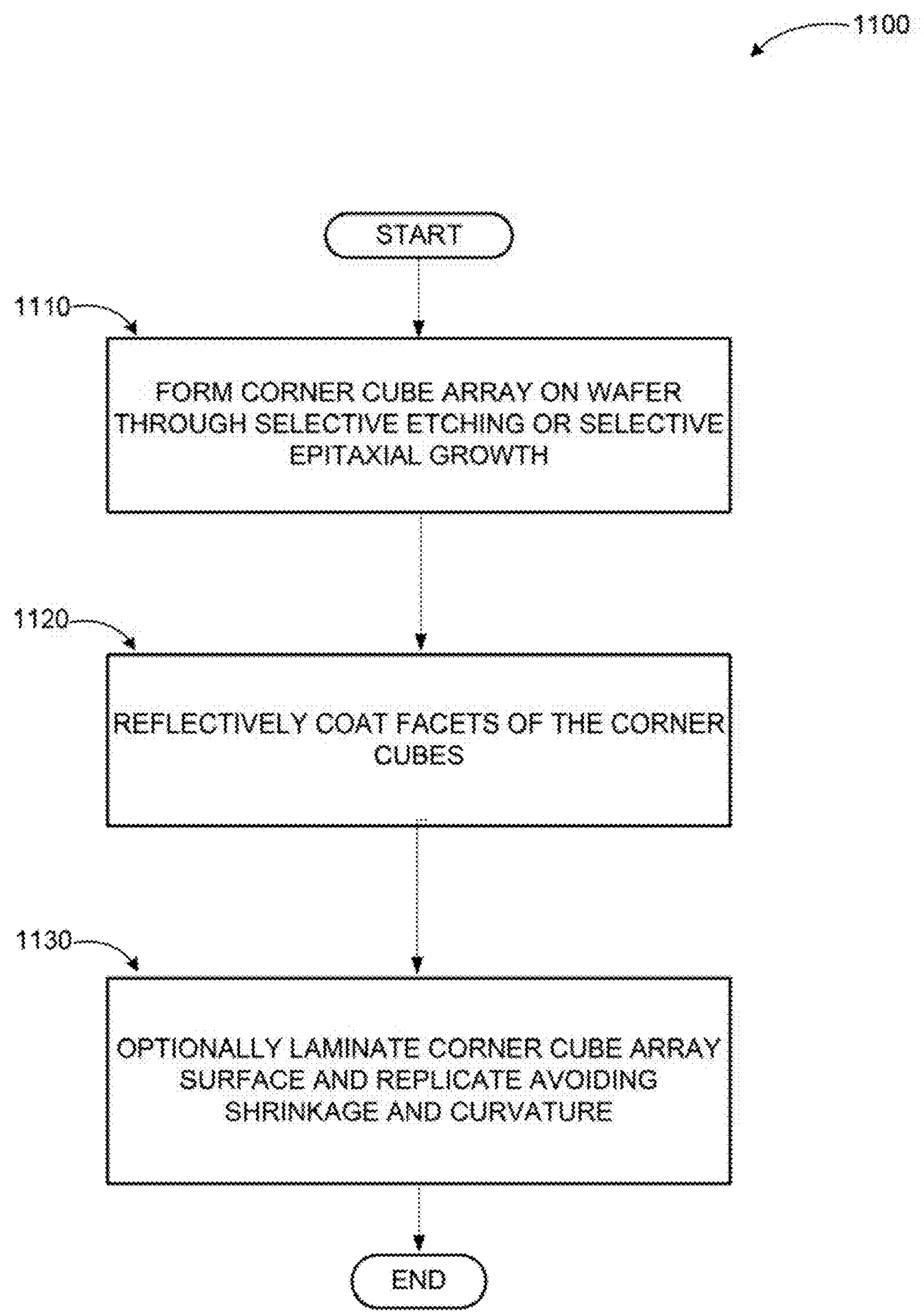
FIG. 11 illustrates a logic flow diagram of a method to fabricate ruled reflective facets for use in retro-reflective imaging systems, according to implementations.

FIG. 11 illustrates a logic flow diagram of a method to provide increased accuracy corner cube arrays for high resolution retro-reflective imaging applications according to implementations. Process 1100 may be implemented on a controller of a fabrication system, for example.

Process 1100 begins with operation 1110, where corner cube features may be formed on a wafer through selective etching, selective epitaxial growth, or similar process.

At operation 1120 following operation 1110, the formed structures may be reflectively coated creating the reflective surface.

At operation 1130 following operation 1120, optional fabrication steps such as lamination, replication to avoid shrinkage or curvature may be performed.

The operations included in process 1100 are for illustration purposes. Providing increased accuracy corner cube arrays for high resolution retro-reflective imaging applications may be implemented by similar processes with fewer or additional steps, as well as in different order of operations using the principles described herein.

Creating CCA structures in the range of 100 μm to 120 μm pitch may be suitable to support readable text in tablet sized virtual displays, while pitches on the order of 600 μm to 1 mm may be used for systems including on the order of a 55" display screen. For ruled type, these pitches may be approximately double the pitch requirement for similar MTF response. Corresponding angular errors of cube faces may need to be <0.03° from nominal crystallographic orientation to realize system MTF capable of supporting readable text.

Following production of a high quality silicon master, processes not limited to electroformed nickel may be used to fabricate mold inserts for high volume replication. Once precision mold parts are produced, sophisticated platen structures not limited to induction heating, flash steam heating, and cooling fluids may be used to precisely control heating of surface layers necessary for embossing.

Further, molding techniques may include double-molding methods, such as molding from a master a first time, which may result in some shrinkage, then molding a second time over the same-aligned first part, thus only allowing shrinkage of the residual added thickness of the subsequent molding step. The process may include two or more over-molds in order to reduce effect of shrinkage and facet curvature on the resulting CCA optic element.

According to some examples, a retro-reflective array is described. The retro-reflective array may include a corner cube array and a reflective surface covering facets of a plurality of corner cube structures of the corner cube array. A pitch for the corner cube structures may be determined based on a type of the retro-reflective array and a tradeoff of a diffraction and an image breakup caused by the retro-reflective array such that a resolution loss is reduced and a modulation transfer function (MTF) of the retro-reflective array is increased.

According to other examples, the reflective surface covering facets of the plurality of corner cube structures may include reflective coating directly applied to the facets of the plurality of corner cube structures, reflective coating applied over a replicated retro-reflective array, or the facets of the plurality of corner cube structure rendered reflective through total internal reflection (TIR). The retro-reflective array may further include a clear resin layer applied over the plurality of corner cubes and a flat layer of optically clear resin fill media molded over the retro-reflective array. The retro-reflective array may also include a clear substrate applied over the clear resin layer, where the clear substrate includes birefringence on one of an outer surface and an inner surface.

According to further examples, the retro-reflective array may include an anti-reflective coating applied on the clear substrate or the anti-reflective coating applied on an outer surface of a retarder layer if the retarder layer is laminated on the outer surface.

According to yet other examples, a display system is described. The display system may include one or more light sources and a beam splitter. The beam splitter may be configured to partially reflect source light from the one or more light sources to a retro-reflective array, where the retro-reflective array includes a reflective surface formed by one or more corner cube arrays (CCAs), and the retro-reflective array is configured to reflect the source light through the beam splitter so that the light is reconvergent.

According to yet further examples, the retro-reflective array may be configured to reflect the source light through the beam splitter by direct use of the CCAs' reflective surface as first surface. The retro-reflective array may also be configured to reflect the source light through the beam splitter by use of a lamination as a second surface on a backside of a clear substrate covering the CCAs. The retro-reflective array may be configured to reflect the source light through the beam splitter by use of a replication of the CCAs with a low shrinkage clear resin covered by a reflective coating or a replication of the CCAs through multiple molding cycles on a single molded part to reduce a thermal shrinkage impact. The CCAs may be formed through selective epitaxial growth of silicon of a <111> oriented silicon wafer. A pitch for the CCAs may be determined based on a type of the retro-reflective array and a tradeoff of a diffraction and an image breakup caused by the retro-reflective array.

According to some examples, a corner cube array (CCA) based retro-reflective array fabrication system is described. The fabrication system may include a growth module configured to employ selective epitaxial growth to form a plurality of corner cube structures on a wafer and a coating module configured to apply reflective coating to one of facets of the plurality of corner cube structures to form a first surface reflector or to a backside of a clear substrate formed over the plurality of corner cube structures using a clear resin to form a second surface reflector. The fabrication system may further include a controller configured to determine a pitch for the corner cube structures based on a tradeoff of a diffraction and an image breakup caused by the retro-reflective array.

According to other examples, the fabrication system may further include a lamination module. The lamination module may apply a clear resin layer over the plurality of corner cubes and apply anti-reflective coating on the substrate. The fabrication system may also include a replication module. The replication module may fabricate multiple replicas of a master tile cut from the wafer and tile the replicas to form a larger new master tile. The replication module may fabricate the multiple replicas through replication in a polymer sheet or an electroform nickel. The replication module may tile the replicas by cutting and sizing through one or more of milling, grinding, polishing, and electron discharge machining (EDM).

According to further examples, the replication module may fabricate mold inserts for high volume replication and control heating of surface layers of the mold inserts for embossing by employing one or more from a list consisting of the following: induction heating, flash steam heating and cooling fluids. The growth module may form the plurality of corner cube structures on the wafer through selective epitaxial growth of silicon of the <111> oriented silicon wafer. The growth module may also form the plurality of corner cube structures on the wafer through vapor selective epitaxial growth using materials selected from a list consisting of the following: trichlorisilane, hydrogen-chloride, and hydrogen gas.

The above specification, examples and data provide a complete description of the manufacture and use of the composition of the implementations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and implementations.

The foregoing detailed description has set forth various implementations of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof, as understood by a person having ordinary skill in the art. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the implementations disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of the disclosure.

What is claimed is:

1. A display system comprising:

one or more light sources; and a beam splitter configured to partially reflect source light from the one or more light sources to a retro-reflective array, the retro-reflective array comprising:

a reflective surface formed by one or more corner cube arrays (CCAs), a reflective surface covering facets of a plurality of corner cube structures of the one or more corner cube arrays (CCAs), wherein the reflective surface covering facets of the plurality of corner cube structures comprises a reflective coating applied over a replicated retro-reflective array and the facets of the plurality of corner cube structures rendered reflective through total internal reflection (TIR), and wherein the retro-reflective array is configured to reflect at least a portion of the source light such that the portion of the source light is transmitted through the beam splitter.

2. The system of claim 1, wherein the retro-reflective array is configured to reflect the portion of the source light through the beam splitter by use of the corner cube arrays' (CCAs) reflective surface as first surface.

3. The system of claim 1, wherein the retro-reflective array is configured to reflect the portion of the source light through the beam splitter by use of a lamination as a second surface on a backside of a clear substrate covering the corner cube arrays (CCAs).

4. The system of claim 3, wherein the retro-reflective array further comprising:

an anti-reflective coating applied on the clear substrate.

5. The system of claim 1, wherein the retro-reflective array further comprising:

anti-reflective coating applied on an outer surface of a retarder layer when the retarder layer is laminated on the outer surface.

6. The system of claim 1, wherein the retro-reflective array is configured to reflect the source light through the beam splitter by use of a replication of the corner cube arrays (CCAs) with a low shrinkage clear resin covered by a reflective coating or a replication of the corner cube arrays (CCAs) through multiple molding cycles on a single molded part to reduce a thermal shrinkage impact.

7. The system of claim 1, wherein the corner cube arrays (CCAs) are formed through selective epitaxial growth of silicon of a <111> oriented silicon wafer.

8. The system of claim 1, wherein a pitch for the corner cube structures is determined based on a type of the retro-reflective array.

9. The system of claim 1, wherein a pitch for the corner cube structures is further determined based on a tradeoff of a diffraction and an image breakup caused by the retro-reflective array.

10. The system of claim 1, wherein the reflective surface covering facets of the plurality of corner cube structures further comprises:

a flat layer of optically clear resin fill media molded over the retro-reflective array.

11. The system of claim 1, wherein the reflective surface covering facets of the plurality of corner cube structures further comprise:

a reflective coating directly applied to the facets of the plurality of corner cube structures.

12. The system of claim 1, wherein a facet angle error between the facets of the corner cube structures is less than 0.02°.

13. A display system comprising:

one or more light sources; and a beam splitter configured to partially reflect source light from the one or more light sources to a retro-reflective array, the retro-reflective array comprising:

a reflective surface formed by one or more corner cube arrays (CCAs), a reflective surface covering facets of a plurality of corner cube structures of the one or more corner cube arrays (CCAs), wherein the reflective surface covering facets of the plurality of corner cube structures comprises one of:

a reflective coating applied over a replicated retro-reflective array;

the facets of the plurality of corner cube structures rendered reflective through total internal reflection (TIR);

a clear resin layer applied over the plurality of corner cube structures; and a flat layer of optically clear resin fill media molded over the retro-reflective array; and wherein the retro-reflective array is configured to reflect at least a portion of the source light such that the portion of the source light travels through the beam splitter.

14. The system of claim 13, wherein a pitch for the corner cube structures is determined based on a type of the retro-reflective array and a tradeoff of a diffraction and an image breakup caused by the retro-reflective array such that a resolution loss is reduced and a modulation transfer function (MTF) of the retro-reflective array is increased.

15. The system of claim 13, wherein the reflective surface covering facets of the plurality of corner cube structures further comprise:

a reflective coating directly applied to the facets of the plurality of corner cube structures.

16. The system of claim 13, wherein a clear substrate applied over the clear resin layer, wherein the clear substrate includes birefringence on one of an outer surface and an inner surface.

17. The system of claim 13, wherein a pitch for the corner cube structures is determined based on a type of the retro-reflective array and a tradeoff of a diffraction and an image breakup caused by the retro-reflective array.

18. The system of claim 13, wherein the corner cube structures are formed through selective epitaxial growth of silicon of a <111> oriented silicon wafer.

19. A display system comprising:

a plurality of light sources, each light source of the plurality of light sources corresponding to a red component, a blue component, or a green component of an RGB color system, the plurality of light sources having a first direction and being divergent;

a beam splitter located in a first path of the plurality of light sources, the first path being in the first direction such that when the source light encounters the beam splitter, a first portion of the plurality of light sources is transmitted through the beam splitter in the first direction, and a second portion of the plurality of light sources is reflected in a second direction; and a retro-reflective array including a plurality of corner cube structures making up a corner cube array, the retro-reflective array being located in a second path being in the second direction, the retro-reflective array reflecting the second portion in a third direction, the third direction being opposite the first direction and reconvergent upon a floating image point, wherein the beam splitter is located in a third path of the plurality of light sources, the third path being in the third direction and wherein a fourth portion of the source light is transmitted through the beam splitter in the third path and reconverges into a floating image at the floating image point, and wherein the plurality of corner cube structures are fabricated using at least one seed cell which directs selective epitaxial growth to grow facets of the corner cube structures.

20. The display system of claim 19, wherein the retro-reflective array further includes first surface, the first surface being a reflective coated surface on the facets of the corner cube structures, and a second surface may include at least one lamination of an optically clear resin.

* * * * *